United States Patent
Sahara et al.

(10) Patent No.: US 7,108,307 B1
(45) Date of Patent: Sep. 19, 2006

(54) VEHICLE SUN VISOR APPARATUS

(75) Inventors: Hideshi Sahara, Toyohashi (JP); Hiromi Suzuki, Kakegawa (JP)

(73) Assignee: ASMO Co., Ltd., Shizuoka-Ken (JP)

( * ) Notice: Subject to any disclaimer, the term of this patent is extended or adjusted under 35 U.S.C. 154(b) by 0 days.

(21) Appl. No.: 11/365,154

(22) Filed: Feb. 28, 2006

(30) Foreign Application Priority Data

| Mar. 2, 2005 | (JP) | ............................. 2005-057714 |
| Jun. 14, 2005 | (JP) | ............................. 2005-173834 |
| Jun. 14, 2005 | (JP) | ............................. 2005-173835 |

(51) Int. Cl.
    *B60J 3/02* (2006.01)
(52) U.S. Cl. .................................... 296/97.4; 296/97.8
(58) Field of Classification Search ............... 296/97.1, 296/97.4, 97.7, 97.8, 97.9; 160/370.22, 310, 160/23.1, 265, 274
    See application file for complete search history.

(56) References Cited

U.S. PATENT DOCUMENTS

| 5,409,284 | A | * | 4/1995 | Mahler | ..................... 296/97.4 |
| 5,443,300 | A | * | 8/1995 | Mohammed | ................ 296/97.4 |
| 5,560,668 | A | * | 10/1996 | Li | ............................. 296/97.8 |
| 5,720,508 | A | * | 2/1998 | Mohammed | ................ 296/97.4 |
| 6,086,133 | A | * | 7/2000 | Alonso | ..................... 296/97.8 |
| 6,227,601 | B1 | * | 5/2001 | LaFrance | ................... 296/97.4 |
| 6,405,781 | B1 | * | 6/2002 | Davies et al. | .............. 160/23.1 |
| 6,407,365 | B1 | * | 6/2002 | De Prete, III | ............ 296/97.11 |
| 2002/0033616 | A1 | * | 3/2002 | Schlecht et al. | ............ 296/138 |
| 2002/0060469 | A1 | * | 5/2002 | Schlecht et al. | ........... 296/97.4 |

FOREIGN PATENT DOCUMENTS

| JP | 8-002251 | 1/1996 |
| JP | 2005-132244 | 5/2005 |

* cited by examiner

*Primary Examiner*—Lori L. Coletta
(74) *Attorney, Agent, or Firm*—Sheridan Ross P.C.

(57) ABSTRACT

A pair of drive gears rotated by a drive motor is meshed with meshing surfaces of a pair of slide guides of a light shield body. A plurality of rotation rollers rotate on roll surfaces of the slide guides and hold the pair of slide guides in a thicknesswise direction of the light shield body. The drive gears have contact portions that come into contact with side surfaces of the slide guides that are arranged to face each other or face opposite directions. Accordingly, a vehicle sun visor apparatus may be reduced in size.

21 Claims, 22 Drawing Sheets

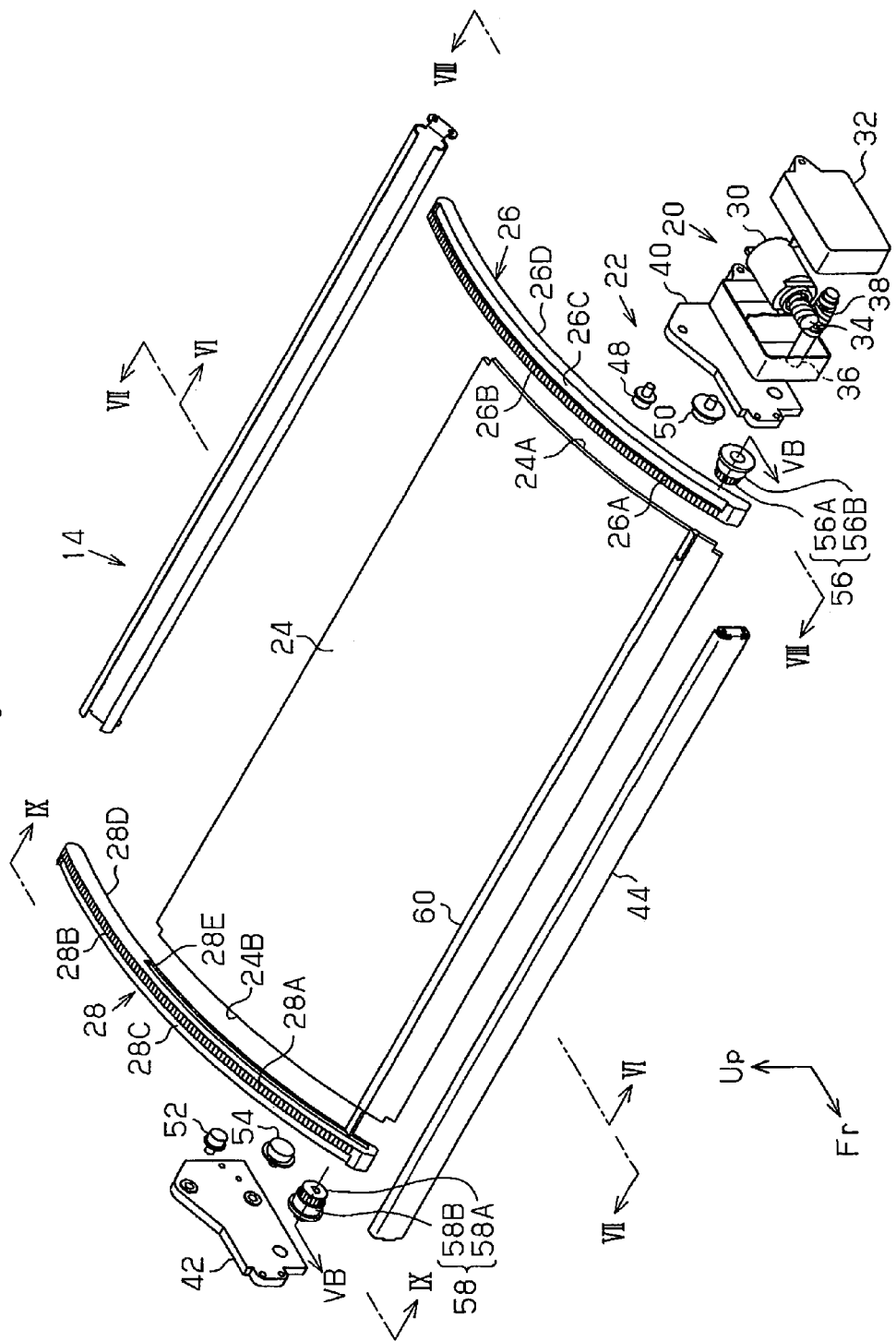

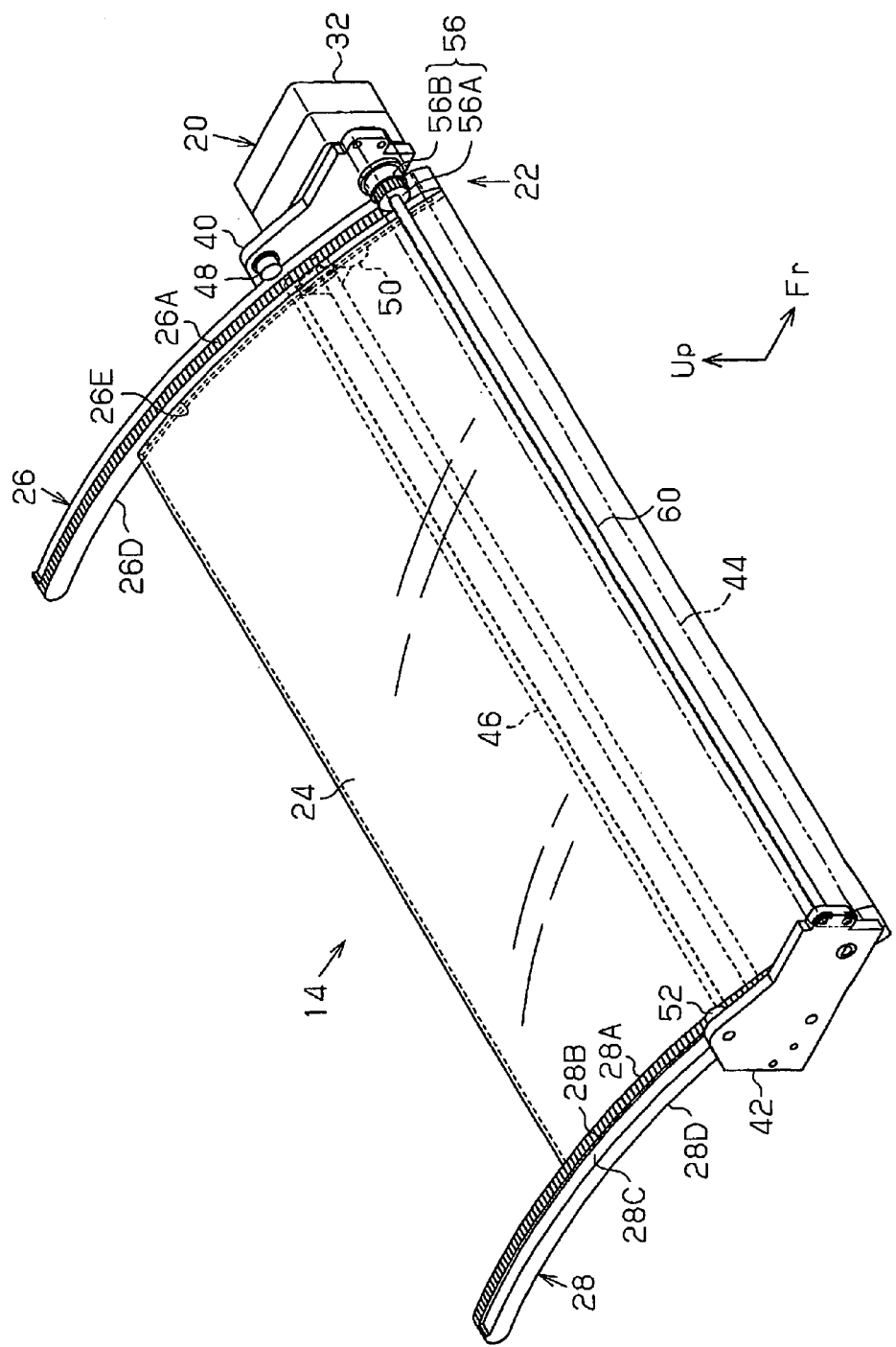

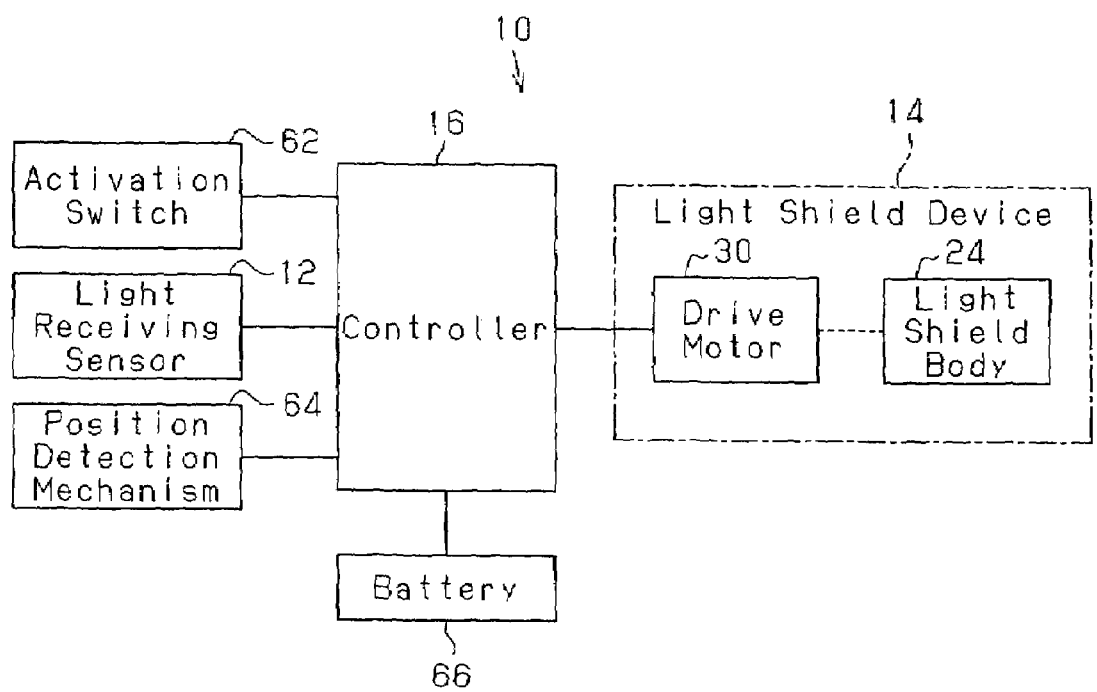

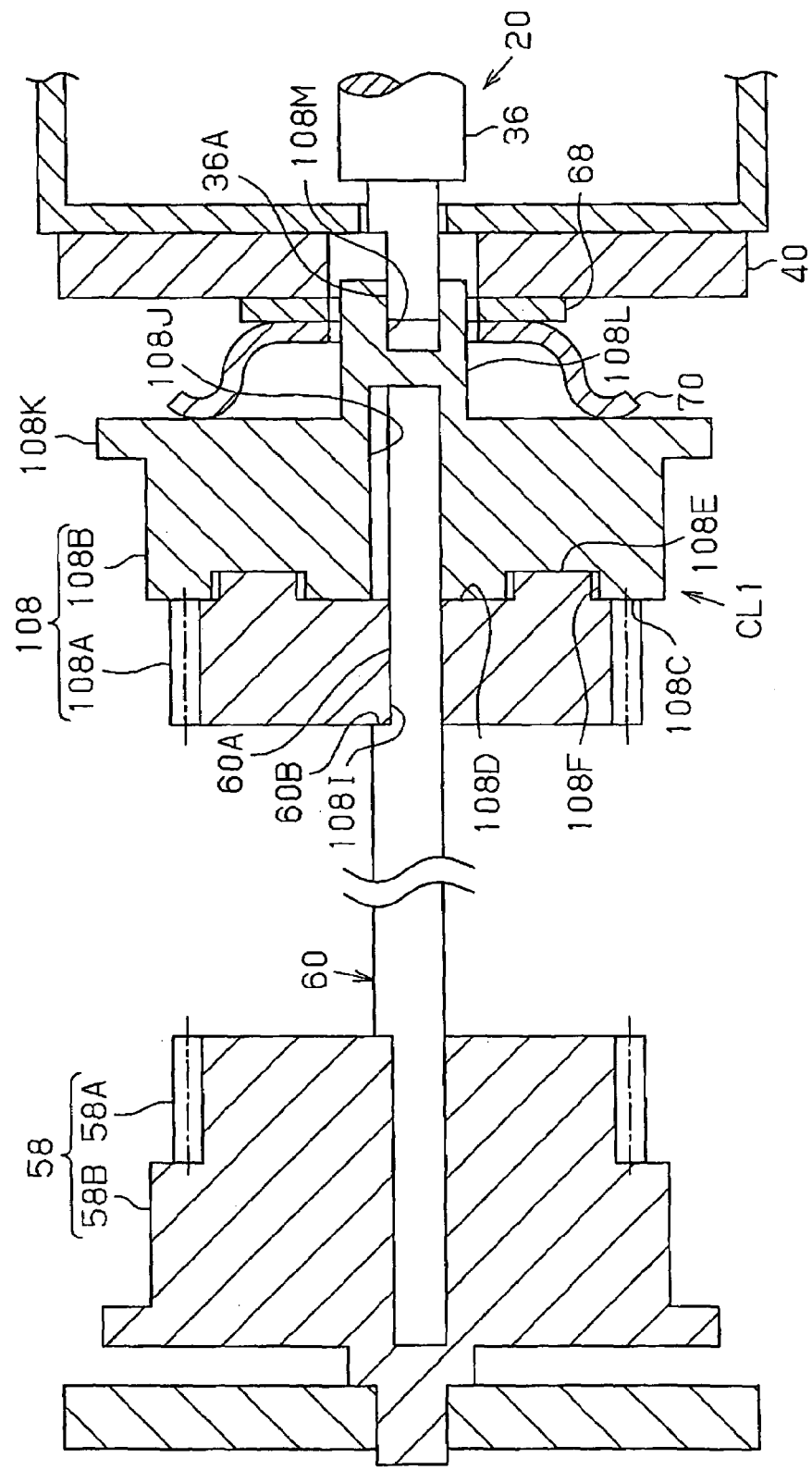

VEHICLE SUN VISOR APPARATUS

BACKGROUND OF THE INVENTION

The present invention relates to a vehicle sun visor apparatus, and more particularly, to a vehicle sun visor apparatus for moving a light shield plate forward and rearward using torque produced by a rotational body that is rotated by a drive motor.

Such type of a vehicle sun visor apparatus is described, for example, in Japanese Laid-Open Patent Publication No. 8-2251. A light shield plate of the vehicle sun visor apparatus described in the publication is supported by a pair of channel-shaped holders in a manner that the light shield plate is slidable with respect to the vehicle's roof. The holders are curved and extend in the longitudinal direction of the vehicle. The driving force produced by a drive motor is transmitted to the light shield plate by a drive pulley and a driven pulley. This moves the light shield plate forward and rearward.

The holders extend throughout the range in which the light shield plate is movable. As a result, the holders are elongated in the longitudinal direction of the vehicle. From the viewpoint of appearance of the passenger compartment, the vehicle sun visor apparatus may be arranged in a roof portion of the vehicle. However, the space in the roof portion is small. Thus, when the holder is long, it becomes difficult to arrange the sun visor apparatus in the roof portion.

SUMMARY OF THE INVENTION

It is an object of the present invention to provide a vehicle sun visor apparatus that may be reduced in size.

To achieve the above object, the present invention provides a vehicle sun visor apparatus including a light shield body for shielding incident light and capable of moving forward and rearward. The light shield body has a widthwise direction intersecting a movement direction of the light shield body and a thicknesswise direction perpendicular to the movement direction and the widthwise direction. A drive motor, fixed to a vehicle body, moves the light shield body forward and rearward. At least one pair of slide guides are arranged on the light shield body and extend in the movement direction of the light shield body. One of the slide guides includes a meshing surface, a roll surface, and a side surface respectively extending in the movement direction. The other one of the slide guides includes a side surface extending in the movement direction and one of a meshing surface and a roll surface extending in the movement direction. The side surfaces of the two slide guides are arranged to be separated from each other in the widthwise direction in a state facing each other or facing opposite directions. A plurality of supports holds the pair of slide guides in the thicknesswise direction. The plurality of supports include a pair of first supports respectively corresponding to the pair of slide guides, and a second support corresponding to at least one of the slide guides. Either one of each of the first supports and the second support is a drive gear meshed with the meshing surface of the corresponding slide guide and rotated by the drive motor, and the other one of each of the first supports and the second support is a rotation roller that is rollable on the roll surface. The two first supports each have a contact portion that comes into contact with the corresponding side surface.

Further, the present invention provides a vehicle sun visor apparatus including a light shield body for shielding incident light entering a passenger compartment and capable of moving forward and rearward. The light shield body has a widthwise direction intersecting the movement direction of the light shield body and a thicknesswise direction perpendicular to the movement direction and the widthwise direction. At least three pairs of supports support the light shield body. The supports are arranged to permit the light shield body to move forward and rearward and restrict movement of the light shield body in the thicknesswise direction. A drive motor directly or indirectly rotates at least one of the supports for moving the light shield body forward and rearward. The light shield body has at least one pair of side surfaces extending in the movement direction, and the side surfaces are arranged to face each other or face opposite directions spaced from each other in the widthwise direction. At least two pairs of the supports include contact portions respectively coming into contact with the at least one pair of side surfaces.

BRIEF DESCRIPTION OF THE DRAWINGS

FIG. 4 is an exploded perspective view showing a light shield device included in the vehicle sun visor apparatus;

FIG. 5A is a perspective view showing the light shield device of FIG. 4;

FIG. 10 is a block diagram showing the electrical structure of the vehicle sun visor apparatus;

FIG. 14 is a cross-sectional view showing an actuation mechanism according to a fourth embodiment of the present invention;

DETAILED DESCRIPTION OF THE PREFERRED EMBODIMENTS

An embodiment of the present invention will now be discussed with reference to the drawings. The members and arrangements discussed hereafter do not limit the present invention and various changes may naturally be made thereto in accordance with the object of the present invention.

The structure of a vehicle sun visor apparatus 10 according to a first embodiment of the present invention will now be described with reference to FIGS. 1 to 11.

Figure 1:
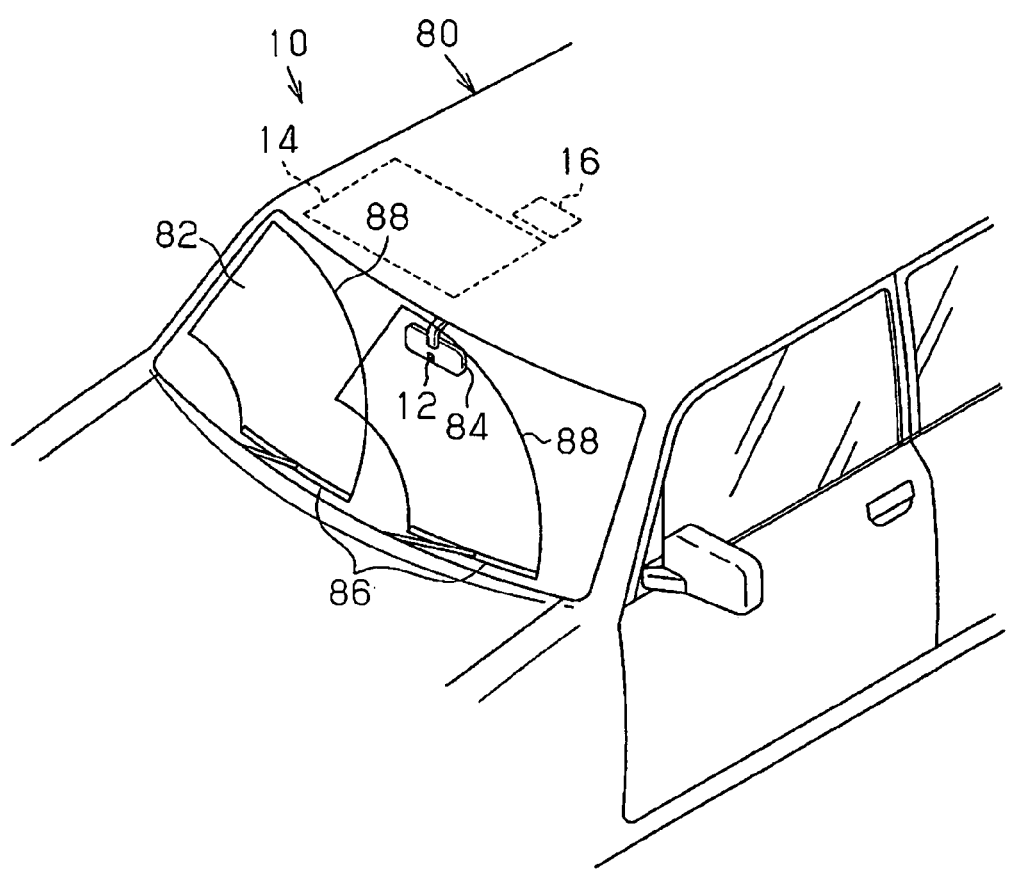
FIG. 1 is a perspective view showing a vehicle in which a vehicle sun visor apparatus according to a first embodiment of the present invention is installed.

As shown in FIG. 1, the vehicle sun visor apparatus 10 is installed in a vehicle (vehicle body) 80 such as a passenger automobile. The vehicle sun visor apparatus 10 includes a light receiving sensor 12, a light shield device 14, and a controller 16.

The light receiving sensor 12 is arranged on the rear surface of a room mirror 84, which is arranged in the passenger compartment to face a front glass 82. The vehicle 80 of the present embodiment includes a wiper apparatus 86 for wiping the outer surface of the front glass 82. A wipe area 88 is formed on the outer surface of the front glass 82 at the rear of the room mirror 84 (at the front side of the vehicle). The wipe area 88 is wiped by the wiper apparatus 86 arranged on the outer surface of the front glass 82. Thus, the light receiving sensor 12 faces the wipe area 88 of the outer surface of the front glass 82 that is wiped using the wiper apparatus 86. In other words, the light receiving sensor 12 is arranged within the wipe area 88 that is wiped using the wiper apparatus 86 as viewed at least in the direction perpendicular to the front glass 82.

Figure 2:
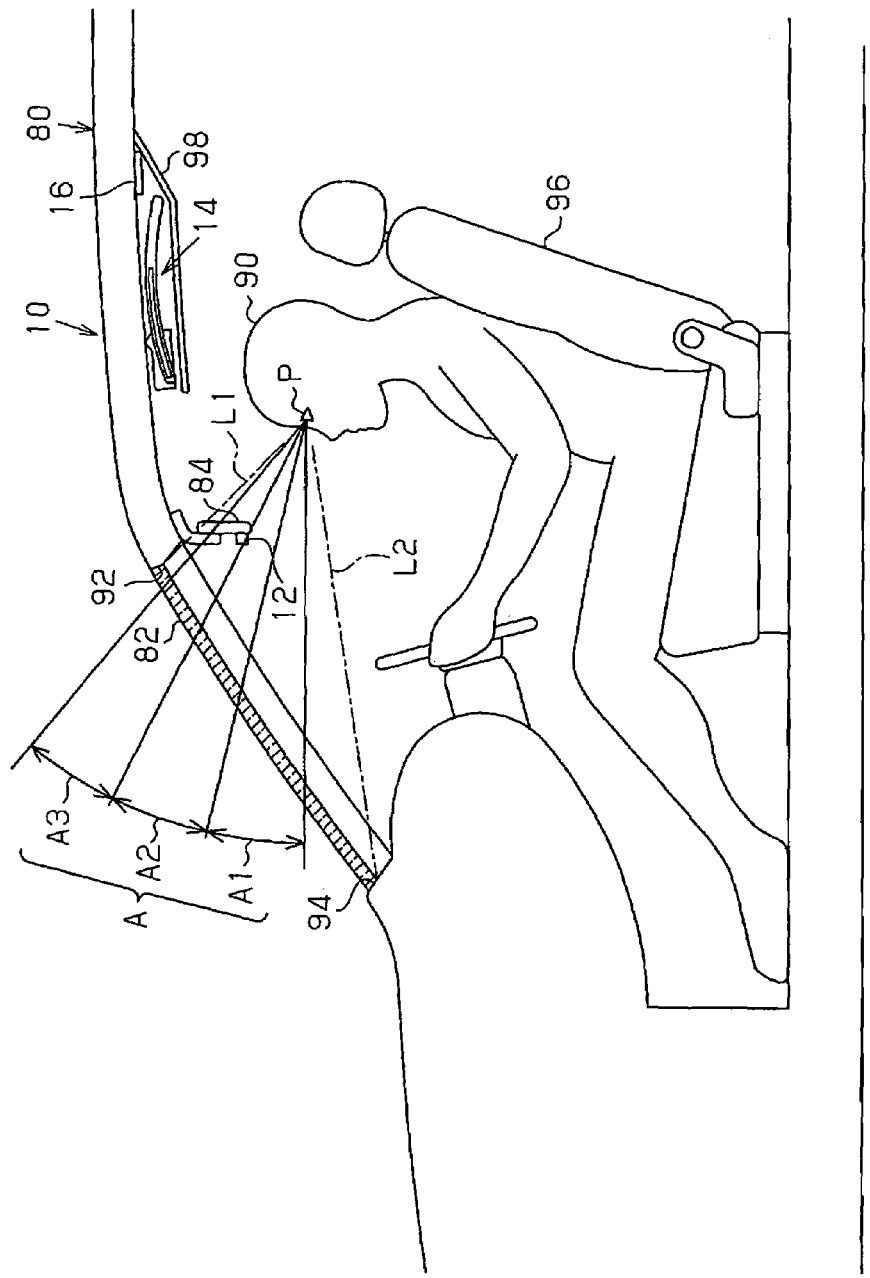
FIG. 2 is a side view showing the interior of the vehicle of FIG. 1.

The light receiving sensor 12 is arranged at a position between a first virtual line L1 and a second virtual line L2 as shown in FIG. 2. The first virtual line L1 is a line linking an upper rim 92 of the front glass 82 and an eye point P of an occupant 90 (driver) of the vehicle 80 viewed from the side of the vehicle. The second virtual line L2 is a line linking a lower rim 94 of the front glass 82 and the eye point P of the occupant 90 viewed from the side of the vehicle. The light receiving sensor 12 is arranged at such a position to ensure the receipt of incident light that passes through the front glass 82 and towards the eye point P of the occupant 90.

Here, the occupant 90 is assumed to have an average height and average body-built. The eye point P of the occupant 90 referred to here is the eye point when such an occupant 90 is seated at an appropriate position in a seat (driver seat) 96 of the vehicle 80.

Figure 3A:
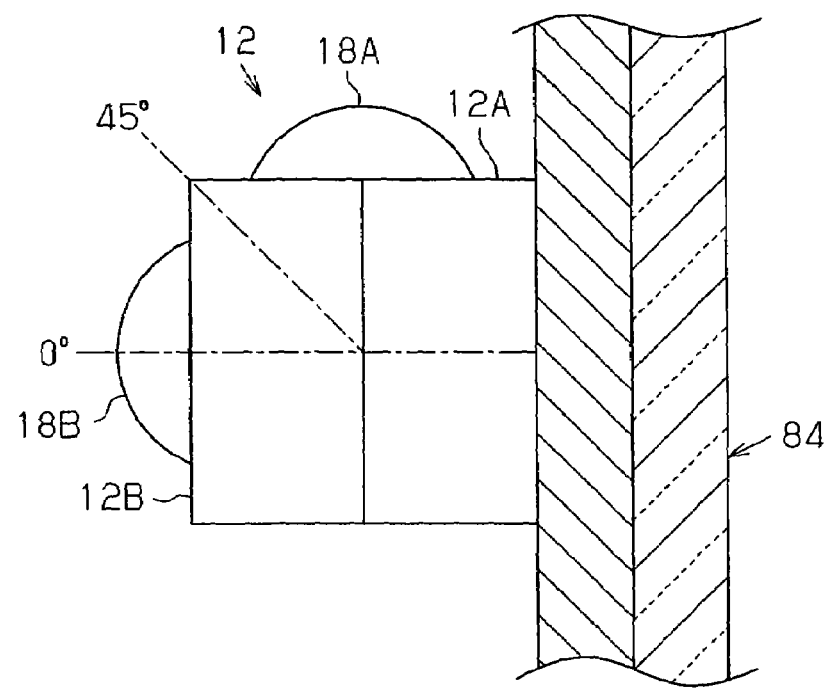
FIG. 3A is a side view of a light receiving sensor arranged on the room mirror shown in FIG. 1.

As shown in FIG. 3A, the light receiving sensor 12 is cubic, and has two light-receiving surfaces. More specifically, the light receiving sensor 12 has an upper light-receiving surface 12A and a front light-receiving surface 12B. When the light receiving sensor 12 is set in the vehicle 80, the upper light-receiving surface 12A is parallel to the floor surface of the vehicle 80 and faces upward, and the front light-receiving surface 12B is perpendicular to the upper light-receiving surface 12A and faces the front side of the vehicle 80. A light-receiving element 18A is arranged on the upper light-receiving surface 12A. A light-receiving element 18B is arranged on the front light-receiving surface 12B. The light-receiving elements 18A and 18B receive incident light that is incident upon the corresponding light-receiving surfaces.

The light receiving sensor 12 receives, at its light-receiving elements 18A and 18B, incident light of, for example, direct sunlight, which passes through the front glass 82. Then, the light receiving sensor 12 outputs, from its light-receiving elements 18A and 18B, incident light detection signals S1 and S2 to the controller 16. The incident light detection signals S1 and S2 are set at levels proportional to the intensity of the incident light. The intensity of incident light changes depending on the incident angle of the light in the manner shown in FIG. 3B.

In the present embodiment, as shown in FIG. 2, a range A in the light shield device 14 shields vertical light is 0 to 45 degrees about a straight line that lies along the eye point P of the occupant 90 and extends parallel to the center line of the vehicle 80.

The vertical light shield range A is divided into three ranges, namely, a first vertical light shield range A1, a second vertical light shield range A2, and a third vertical light shield range A3. The first vertical light shield range A1 is a range of 0 to 15 degrees about the straight line that lies along the eye point P of the occupant 90 in the driver seat and extends parallel to the center line of the vehicle 80. The second vertical light shield range A2 is a range of 15 to 30 degrees about the straight line. The third vertical light shield range A3 is a range of 30 to 45 degrees about the straight line.

The light receiving sensor 12 outputs the incident light detection signals S1 and S2 for specifying the incident angle in the vertical direction. More specifically, the light receiving sensor 12 outputs, from its light-receiving elements 18A and 18B arranged on the upper light-receiving surface 12A and the front light-receiving surface 12B that is 90 degrees from the upper light-receiving surface 12A, the incident light detection signals S1 and S2 for specifying the incident angle of light that enters the vertical light shield range A.

Figure 5B:
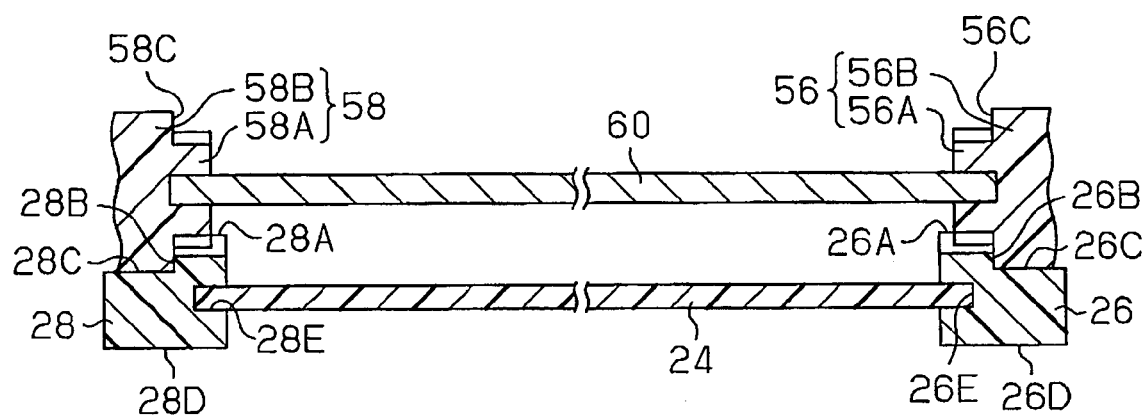
FIG. 5B is a cross-sectional view taken along line VB—VB in FIG. 4.

As shown in FIG. 2, the light shield device 14 is accommodated in a roof portion 98 (the space between outer roof and inner roof panels) near the driver seat of the vehicle 80. As shown in FIGS. 4 and 5A, the light shield device 14 includes a drive unit 20, an actuation mechanism 22, a light shield plate 24, and first and second slide guides 26 and 28. The light shield plate 24 and the first and second slide guides 26 and 28 form a light shield body 5.

The drive unit 20 includes a drive motor 30. The drive motor 30 is accommodated in a housing 32. A rotation shaft of the drive motor 30 has a first gear (worm) 34. An output shaft 36 that is perpendicular to the rotation shaft of the drive motor 30 has a second gear (worm wheel) 38. The second gear 38 is engaged with the first gear 34.

The actuation mechanism 22 includes a pair of left and right brackets, namely, first and second brackets 40 and 42. The first and second brackets 40 and 42 are connected by a pair of connection frames 44 and 46, which extend in the lateral direction of the vehicle. The connection frames 44 and 46 connect the first and second brackets 40 and 42 at the front and rear sides with respect to the vehicle. An upper auxiliary roller 48 and a lower auxiliary roller 50 are set in a rotatable manner on the left first bracket 40. An upper auxiliary roller 52 and a lower auxiliary roller 54 are set in a rotatable manner on the right second bracket 42.

Figure 6:
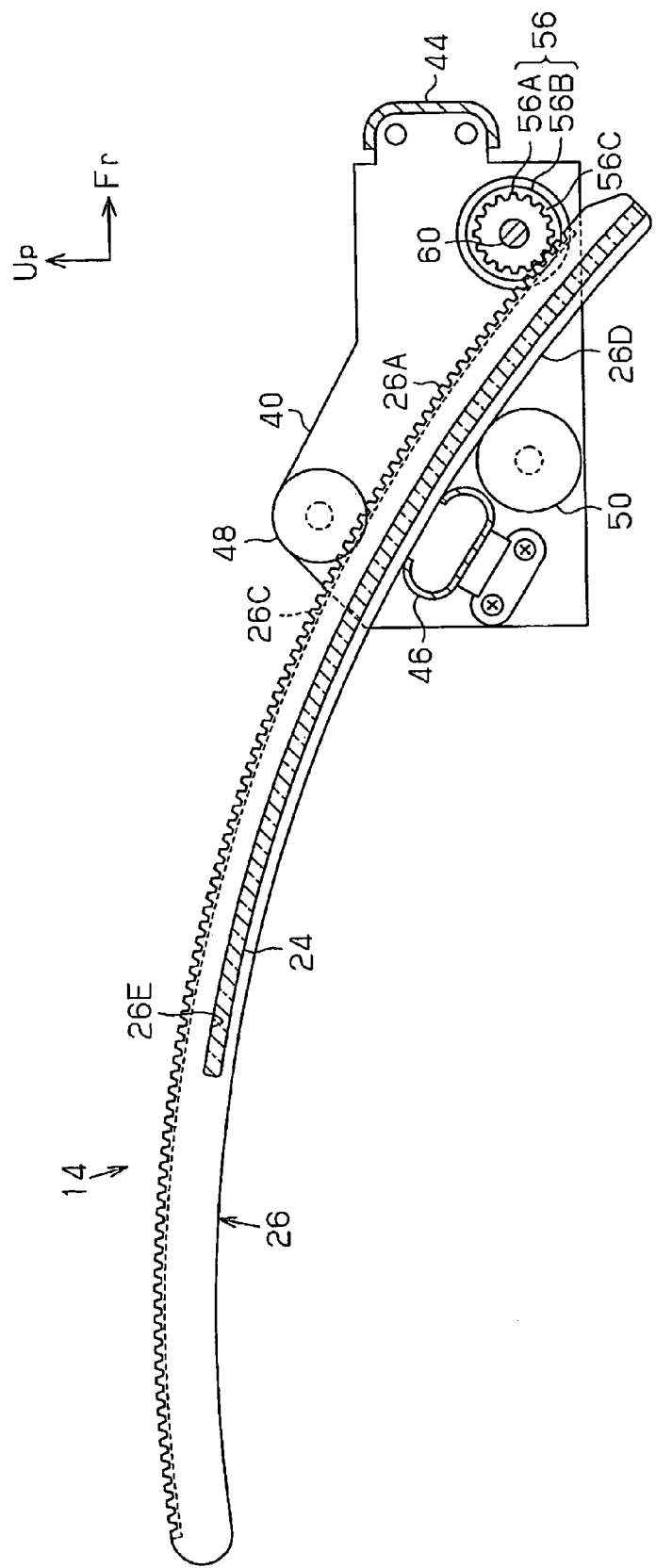
FIG. 6 is a cross-sectional view taken along line VI—VI in FIG. 4.

As shown in FIG. 6, the upper auxiliary roller 48 set on the first bracket 40 is arranged at the upper side of the first slide guide 26 and rotates while in contact with a first roll surface 26C of the first slide guide 26, which will be described later. The lower auxiliary roller 50 set on the first bracket 40 is arranged at the lower side of the first slide guide 26 and rotates while in contact with a second roll surface 26D of the first slide guide 26, which will be described later.

Figure 7:
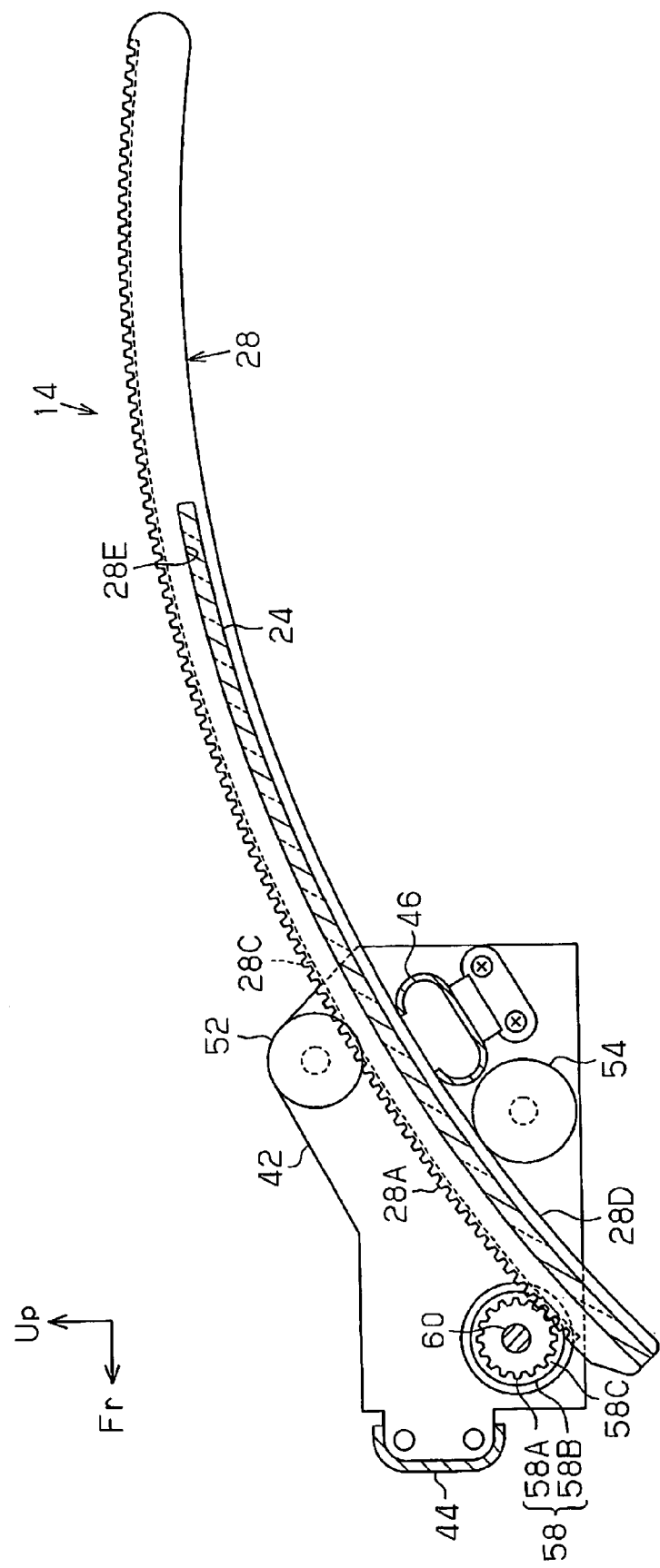
FIG. 7 is a cross-sectional view taken along line VII—VII in FIG. 4.

In the same manner, as shown in FIG. 7, the upper auxiliary roller 52 set on the second bracket 42 is arranged at the upper side of the second slide guide 28 and rotates while in contact with a first roll surface 28C of the second slide guide 28, which will be described later. The lower auxiliary roller 54 set on the second bracket 42 is arranged at the lower side of the second slide guide 28 and rotates while in contact with a second roll surface 28D of the second slide guide 28, which will be described later.

In the present embodiment, the upper auxiliary rollers 48 and 52 are made of resin so that they can be obtained at a low cost and be manufactured easily. The lower auxiliary rollers 50 and 54 are made of rubber so that they absorb vibrations during operation of the actuation mechanism 22. Further, the lower auxiliary rollers 50 and 54 are arranged at positions separated from first and second drive wheels 56 and 58, which will be described later, on opposite sides of the first and second slide guides 26 and 28 in the direction in which the first and second slide guides 26 and 28 move (track direction). As a result, the lower auxiliary rollers 50 and 54 cooperate with the first and second drive wheels 56 and 58 to hold the first and second slide guides 26 and 28 therebetween.

As shown in FIGS. 4 and 5A, the housing 32 accommodating the drive motor 30 is fixed to the first bracket 40. The output shaft 36 of the drive unit 20 is inserted through the first bracket 30 in a rotatable manner. The first drive wheel 56 is arranged on a projected distal portion of the output shaft 36. The second drive wheel 58 is set on the second bracket 42 in a rotatable manner. The first drive wheel 56 and the second drive wheel 58 are fixed to a single rotation shaft 60. The first drive wheel 56 and the second drive wheel 58 are rotated in synchronism with the drive motor 30.

A first drive gear (pinion) 56A is formed at an inner side of the left first drive wheel 56 in the lateral direction of the vehicle. A first rotation roller 56B is formed coaxially with the first drive gear 56A at an outer side of the first drive wheel 56 in the lateral direction of the vehicle. In the present embodiment, the first drive gear 56A and the first rotation roller 56B of the first drive wheel 56 are formed integrally from a resin material. In the present embodiment, the first drive wheel 56 is formed as a stepped drive wheel, and the outer diameter of a circle along the distal ends of the teeth of the first drive gear 56A is set smaller than the outer diameter of the first rotation roller 56B. In other words, the first drive gear 56A forms a small-diameter portion, and the first rotation roller 56B forms a large-diameter portion.

The first drive gear 56A is meshed with a meshing surface (rack) 26A of the first slide guide 26, which will be described later. The first rotation roller 56B comes into contact with the first roll surface 26C of the first slide guide 26, which will be described later, during rotation of the first drive wheel 56 and supports the first slide guide 26.

In the same manner, a second drive gear (pinion) 58A is formed at an inner side of the right second drive wheel 58 in the lateral direction of the vehicle. A second rotation roller 58B is formed coaxially with the second drive gear 58A at an outer side of the second drive wheel 58 in the lateral direction of the vehicle. In the present embodiment, the second drive gear 58A and the second rotation roller 58B of the second drive wheel 58 are formed integrally from a resin material. In the present embodiment, the second drive wheel 58 is formed as a stepped drive wheel, and the outer diameter of the second drive gear 58A that is defined at the distal ends of the teeth is set smaller than the outer diameter of the second rotation roller 58B. In other words, the second drive gear 58A forms a small-diameter portion, and the second rotation roller 58B forms a large-diameter portion.

The second drive gear 58A is engaged with a meshing surface (rack) 28A of the second slide guide 28, which will be described later. The second rotation roller 58B comes into contact with the first roll surface 28C of the second slide guide 28, which will be described later, during rotation of the second drive wheel 58 and supports the second slide guide 28. In other words, the first and second drive gears 56A and 58A function as a pair of first supports corresponding to the first and second slide guides 26 and 28. The first and second rotation rollers 56B and 58B function as a second support corresponding to at least one of the first and second slide guides 26 and 28.

The light shield plate 24 may completely block incident light of, for example, direct sunlight, which passes through the front glass 82 and enters the vehicle interior. However, in the present embodiment, the light shield plate 24 is formed from a semi-transparent or colored-transparent resin material. The light shield plate 24 using such a semi-transparent or colored-transparent material ensures the field of view for the occupant 90 while shielding incident light of, for example, direct sunlight, which passes through the front glass 82 and enters the vehicle interior.

The first and second slide guides 26 and 28 are arranged at the two sides of the light shield plate 24, respectively. The first and second slide guides 26 and 28 are formed from a resin material and are symmetric to each other with respect to the light shield plate 24. In the present embodiment, the first and second slide guides 26 and 28 are formed to be curved downward from the rear side to the front side of the vehicle so that when the drive unit 20 and the actuation mechanism 22 operate, the first and second slide guides 26 and 28 enable the light shield plate 24 to move forward from the rear side to the front side of the vehicle and at the same time move from the upper side to the lower side of the vehicle to a position facing the occupant 90.

The light shield plate 24, which is formed in correspondence with the curved shapes of the first and second slide guides 26 and 28, is curved downward from the rear side to the front side of the vehicle. In the present embodiment, the light shield plate 24 does not have a front frame portion and a rear frame portion that are formed as separate members on the front edge and the rear edge. This improves the appearance of the entire peripheral portion of the light shield plate 24.

In the present embodiment, the first and second slide guides 26 and 28 have fitting recesses 26E and 28E, which are fitted to fitting protrusions 24A and 24B that are formed on the two sides of the light shield plate 24. The fitting protrusions 24A and 24B and the fitting recesses 26E and 28E are engaged with each other so that the first and second slide guides 26 and 28 are fixed to the two sides of the light shield plate 24, respectively. The first and second slide guides 26 and 28 are formed to be longer than the light shield plate 24 in the longitudinal direction of the vehicle and extend longer to the rear side of the vehicle than the light shield plate 24.

Figure 8:
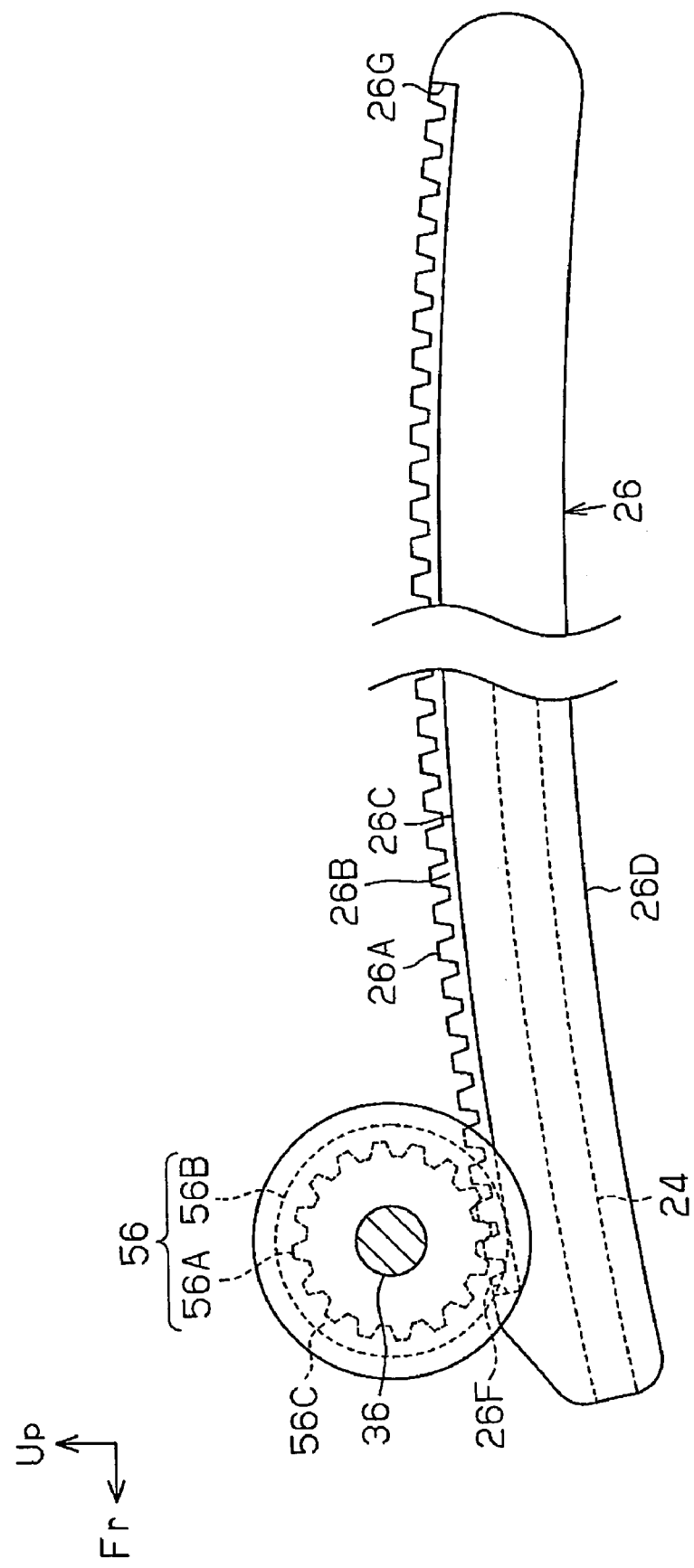
FIG. 8 is a cross-sectional view taken along line VIII—VIII in FIG. 4.

As shown in FIG. 8, the meshing surface 26A, which extends in the longitudinal direction of the left first slide guide 26, is formed at an inner side of an upper part of the first slide guide 26 in the vehicle lateral direction. The first roll surface 26C is formed at an outer side of the upper part of the first slide guide 26 in the vehicle lateral direction. The first roll surface 26C is formed at a position one step lower than the meshing surface 26A by way of a side surface 26B, which is arranged together with the meshing surface 26A and extends in the direction in which the light shield plate 24 moves (movement direction). Further, the second roll surface 26D, which extends in the longitudinal direction of the first slide guide 26, is formed on a lower part of the first slide guide 26.

Figure 9:
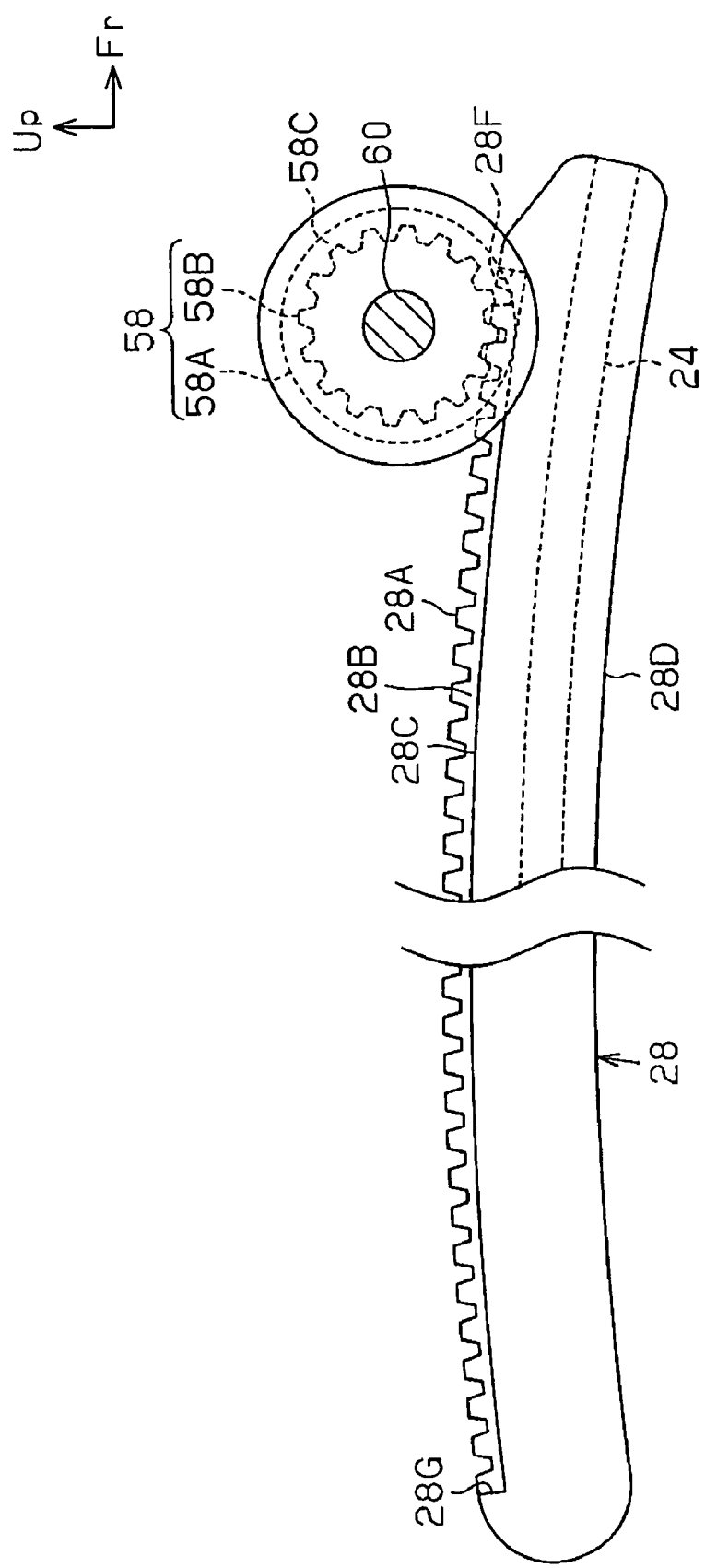
FIG. 9 is a cross-sectional view taken along line IX—IX in FIG. 4.

In the same manner, as shown in FIG. 9, the meshing surface 28A, which extends in the longitudinal direction of the right second slide guide 28, is formed at an inner side of an upper part of the second slide guide 28 in the vehicle lateral direction. The first roll surface 28C is formed at an outer side of the upper part of the second slide guide 28 in the vehicle lateral direction. The first roll surface 28C is formed at a position one step lower than the meshing surface 28A by way of a side surface 28B, which is arranged together with the meshing surface 28A and extends in the direction in which the light shield plate 24 moves. Further, the second roll surface 28D, which extends in the longitudinal direction of the second slide guide 28, is formed on a lower part of the second slide guide 28.

In the present embodiment, the first and second slide guides 26 and 28 are formed to have the curved shapes as described above. The meshing surfaces 26A and 28A, the first roll surfaces 26C and 28C, and the second roll surfaces 26D and 28D of the first and second slide guides 26 and 28 are formed to extend in the longitudinal direction of the first and second slide guides 26 and 28. In other words, the meshing surfaces 26A and 28A, the first roll surfaces 26C and 28C, and the second roll surfaces 26D and 28D are formed as curved tracks.

In the present embodiment, the first roll surface 26C of the first slide guide 26 is formed at the position one step lower than the meshing surface 26A by way of the side surface 26B as shown in FIG. 8. As a result, end surfaces 26F and 26G are formed at the two ends of the first slide guide 26 in the longitudinal direction, respectively. The end surfaces 26F and 26G are connected to the side surface 26B and the first roll surface 26C. The end surfaces 26F and 26G function as stoppers with which the first rotation roller 56B comes into contact before the first drive gear 56A reaches the two stroke ends of the meshing surface 26A.

In the same manner, the first roll surface 28C of the second slide guide 28 is formed at the position one step lower than the meshing surface 28A by way of the side surface 28B as shown in FIG. 9. As a result, end surfaces 28F and 28G are formed at the two ends of the second slide guide 28 in the longitudinal direction, respectively. The end surfaces 28F and 28G are connected to the side surface 28B and the first roll surface 28C. The end surfaces 28F and 28G function as stoppers with which the second rotation roller 58B comes into contact before the second drive gear 58A reaches the two stroke ends of the meshing surface 28A.

In the present embodiment, when the first and second drive wheels 56 and 58 reach the vehicle front side ends of the first and second slide guides 26 and 28 or the vehicle rear side ends of the first and second slide guides 26 and 28, the first and second rotation rollers 56B and 58B come into contact with the end surfaces 26F and 28F or the end surfaces 26G and 28G before the gear teeth of the first and second drive gears 56A and 58A rides onto the flat parts at the vehicle front side of the meshing surfaces 26A and 28A or the flat parts at the vehicle rear side of the meshing surfaces 26A and 28A. This prevents the gear teeth of the first and second drive gears 56A and 58A from being damaged.

In the present embodiment, the vehicle front side stroke end of the first roll surface 26C of the first slide guide 26 and the vehicle front side stroke end of the meshing surface 26A coincide with each other in the movement direction of the light shield plate 24 as shown in FIG. 8. In the same manner, the vehicle front side stroke end of the first roll surface 28C of the second slide guide 28 and the vehicle front side stroke end of the meshing surface 28A coincide with each other in the movement direction of the light shield plate 24 as shown in FIG. 9. This improves the appearance of the side parts of the first and second slide guides 26 and 28 at front side of the vehicle when the light shield plate 24 is moved to a half extended position or to a completely extended position, which will be described later.

In the present embodiment, the vehicle rear side stroke end of the first roll surface 26C of the first slide guide 26 and the vehicle rear side stroke end of the meshing surface 26A coincide with each other in the movement direction of the light shield plate 24 as shown in FIG. 8. In the same manner, the vehicle rear side stroke end of the first roll surface 28C of the second slide guide 28 and the vehicle rear side stroke end of the meshing surface 28A coincide with each other in the movement direction of the light shield plate 24 as shown in FIG. 9.

The first and second slide guides 26 and 28 respectively have the side surfaces 26B and 28B, which extend in the movement direction of the light shield plate 24. The side surfaces 26B and 28B are arranged so as to be spaced from each other in the direction perpendicular to the movement direction. The side surfaces 26B and 28B are arranged in directions that are opposite to each other, that is, in reverse directions.

The first and second rotation rollers 56B and 58B respectively have contact portions 56C and 58C, which are formed adjacent to the first and second drive gears 56A and 58A. The contact portions 56C and 58C are arranged to face each other. Each of the contact portions 56C and 58C comes into contact with the opposing one of the side surfaces 26B and 28B.

The first and second rotation rollers 56B and 58B respectively have contact portions 56C and 58C, which are formed adjacent to the first and second drive gears 56A and 58A. The contact portions 56C and 58C are arranged to face each other. Each of the contact portions 56C and 58C comes into contact with the opposing one of the side surfaces 26B and 28B.

The light shield body 5 is moved forward or rearward while the contact portions 56C and 58C of the first and second drive wheels 56 and 58 are in contact with the side surfaces 26B and 28B of the first and second slide guides 26 and 28. As a result, the light shield body 5 is moved forward or rearward while being prevented from being displaced in the widthwise direction (in the direction perpendicular to the movement direction).

In the present embodiment, the controller 16 is accommodated in the roof portion 98 near the driver seat of the vehicle 80 as shown in FIG. 2. The light receiving sensor 12, an activation switch 62, a position detection mechanism 64, and a battery 66 are connected to an input unit of the controller 16 as shown in FIG. 10. The drive motor 30 of the light shield device 14 is connected to an output unit of the controller 16.

Figure 3B:
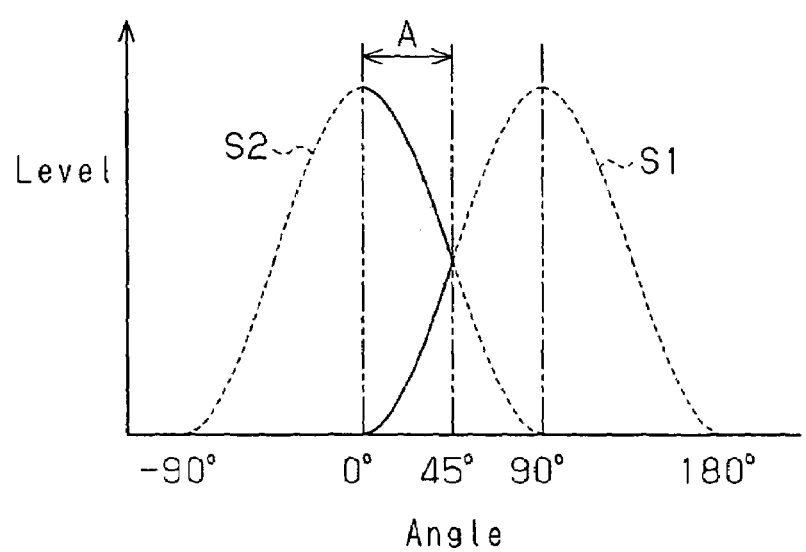
FIG. 3B is a graph showing the relationship between the level of each incident light detection signal output from the light receiving sensor of FIG. 3A and the incident angle of light.

The controller 16 prestores data on incident light that is received by the light-receiving elements 18A and 18B, which are arranged on the upper light-receiving surface 12A and the front light-receiving surface 12B. More specifically, the controller 16 prestores data showing the relationship between each incident angle in the vertical direction and the levels of the incident light detection signals S1 and S2 that are output in proportion to the intensity of light incident at that incident angle. FIG. 3B shows one example of such data. The controller 16 determines the incident angle of incident light based on the ratio of the levels of the incident angle detection signals S1 and S2 output from the light-receiving elements 18A and 18B.

The position detection mechanism 64 includes a rotary encoder, a variable resistor, a rotary switch, and a limit switch to detect and distinguish when the light shield plate 24 is located at a completely extended position, a half extended position, or a retracted position. When the light shield plate 24 is at the completely extended position, the half extended position, or the retracted position, the position detection mechanism 64 outputs a position detection signal indicating the detected position to the controller 16. Based on the position detection signal, the controller 16 distinguishes the light shield plate 24 being in a completely extended state, the half extended position, and the retracted state.

The operation of the vehicle sun visor apparatus 10 of the first embodiment will now be described.

When the activation switch 62 is turned on, the controller 16 is supplied with drive power from the battery 66 and activated. The light receiving sensor 12 is also supplied with power and activated. When incident light of, for example, direct sunlight passes through the front glass 82 and enters the vertical light shield range A, the light-receiving elements 18A and 18B of the light receiving sensor 12 output to the controller 16 the incident light detection signals S1 and S2 having levels proportional to the incident light intensity, which changes in accordance with the incident angle of the incident light in the manner shown in FIG. 3B.

Based on the incident light detection signals S1 and S2 output from the light-receiving elements 18A and 18B of the light receiving sensor 12, the controller 16 specifies the incident angle in the vertical direction using the data showing the relationship between each incident angle in the vertical direction and the levels of the incident light detection signals S1 and S2 that are proportional to the intensity of the light that is incident at that incident angle.

Subsequently, the controller 16 determines whether the light shield plate 24 is to be set in the completely extended state in which the light shield plate 24 is completely extended, the half extended state in which the light shield plate 24 is halfway extended, or the retracted state in which the light shield plate 24 is completely retracted into the roof portion 98. The controller 16 performs this determination based on the vertical-direction incident angle of the incident light that enters the vertical light shield range A.

Figure 11A:
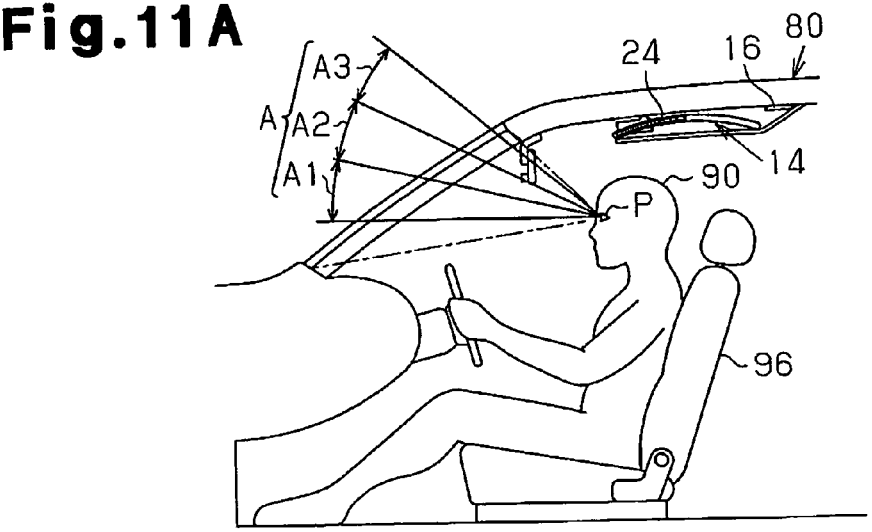
FIG. 11A is a side view showing the light shield plate shown in FIG. 2 in a retracted state.
Figure 11B:
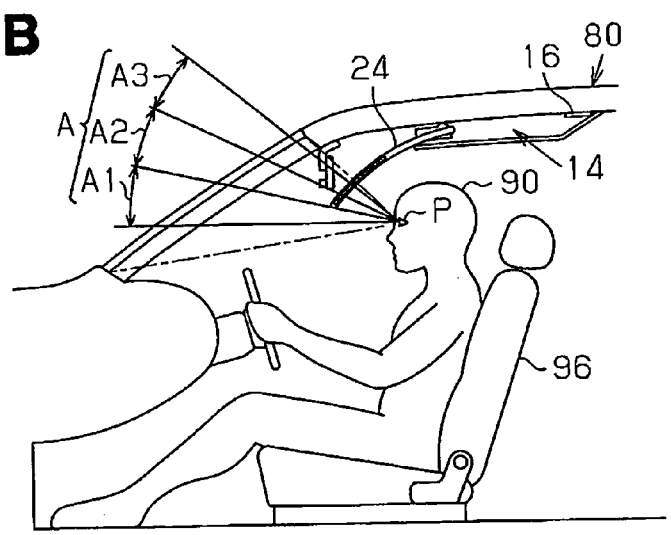
FIG. 11B is a side view showing the light shield plate shown in FIG. 2 in a half extended state.
Figure 11C:
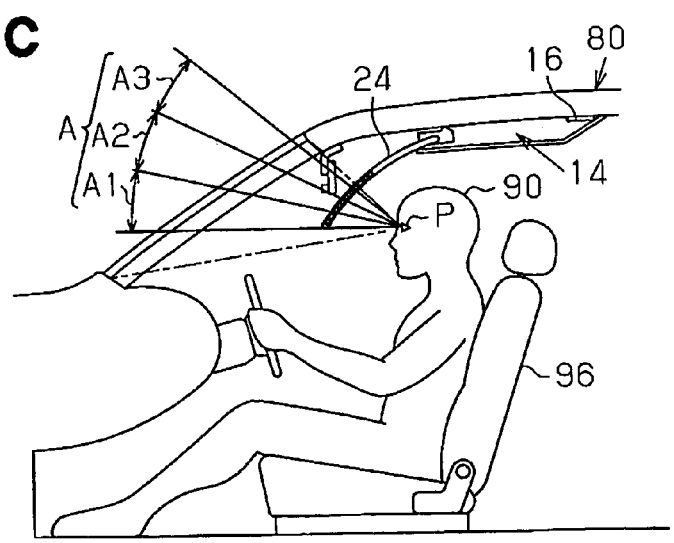
FIG. 11C is a side view showing the light shield plate shown in FIG. 2 in a completely extended state.

More specifically, the controller 16 maintains the light shield plate 24 in the retracted state as shown in FIG. 11A when the incident light enters the third vertical light shield range A3. The controller 16 sets the light shield plate 24 in the half extended state as shown in FIG. 11B when the incident light enters the second vertical light shield range A2. The controller 16 sets the light shield plate 24 in the completely extended state as shown in FIG. 11C when the incident light enters the first vertical light shield range A1. The controller 16 sets the light shield plate 24 in the retracted state when the incident light enters areas that are not within the vertical light shield range A.

The controller 16 drives the drive motor 30 when determining that the light shield plate 24 is to be set in the half extended state or the completely extended state. The first and second drive wheels 56 and 58 rotate when the drive motor 30 is driven. As the first and second drive wheels 56 and 58 rotate when the drive motor 30 produces rotation, the meshing surfaces 26A and 28A of the first and second slide guides 26 and 28 that are meshed with the first and second drive gears 56A and 58A of the first and second drive wheels 56 and 58 are moved toward the front of the vehicle. The light shield plate 24 moves toward the front of the vehicle together with the first and second slide guides 26 and 28.

In this state, the first roll surfaces 26C and 28C formed on the upper parts of the first and second slide guides 26 and 28, which are respectively arranged on the two sides of the light shield plate 24 in the vehicle lateral direction, are supported by the first and second rotation rollers 56B and 58B of the first and second drive wheels 56 and 58 and the upper auxiliary rollers 48 and 52 that rotate while in contact with the first roll surfaces 26C and 28C. Further, the second roll surfaces 26D and 28D formed on the lower parts of the first and second slide guides 26 and 28 are supported by the lower auxiliary rollers 50 and 54 that rotate while in contact with the second roll surfaces 26D and 28D.

Accordingly, in the present embodiment, the first and second slide guides 26 and 28 are supported by the upper auxiliary rollers 48 and 52, the first drive wheels 56 and 58, and the lower auxiliary rollers 50 and 54 and held between the upper auxiliary rollers 48 and 52 and the first drive wheels 56 and 58, and the lower auxiliary rollers 50 and 54 in the vertical direction. In this state, the first and second slide guides 26 and 28 are supported with the load being low and the produced noise being low. The light shield plate 24 slides together with the first and second slide guides 26 and 28.

When the light shield plate 24 is set in the half extended state or in the completely extended state, the position detection mechanism 64 detects the half extended state or the completely extended state of the light shield plate 24. The position detection mechanism 64 outputs a position detection signal showing the half extended state or the completely extended state to the controller 16. As a result, the controller 16 detects that the shifting of the light shield plate 24 into the half extended state or the completely extended state has been completed and stops driving the drive motor 30.

The driving condition of the vehicle may change and incident light may enter the first vertical light shield range A1 when the light shield plate 24 is in the half extended state. In this case, the light shield plate 24 is shifted to the completely extended state as shown in FIG. 11C. In this state, the position detection mechanism 64 detects the completely extended state of the light shield plate 24 and the controller 16 stops driving the drive motor 30 when detecting that the shifting of the light shield plate 24 to the completely extended state has been completed.

In the present embodiment, the light shield plate 24 is in the completely extended state when the first rotation roller 56B comes into contact with the end surface 26G of the first slide guide 26 and the second rotation roller 58B comes into contact with the end surface 28G of the second slide guide 28. In this state, the first and second rotation rollers 56B and 58B come into contact with the end surfaces 26G and 28G before the first and second drive gears 56A and 58A reach the vehicle rear side stroke ends of the meshing surfaces 26A and 28A of the first and second slide guides 26 and 28. This prevents the first and second drive gears 56A and 58A from getting caught.

The driving condition of the vehicle may change and incident light may enter the second vertical light shield range A2 when the light shield plate 24 is in the completely extended state. In this case, the light shield plate 24 is set in the half extended state as shown in FIG. 11B to ensure the field of view for the occupant 90. Further, the driving condition of the vehicle may change and incident light may enter the third vertical light shield range A3 or incident light may enter areas that are not within the vertical light shield range A when the light shield plate 24 is in the completely extended state or the half extended state. In this case, the light shield plate 24 is set in the retracted state as shown in FIG. 11A to ensure the field of view for the occupant 90. The position detection mechanism 64 detects the half extended state or the retracted state of the light shield plate 24, and the controller 16 stops driving the drive motor 30 upon detecting that the shifting of the light shield plate 24 to the half extended state or the retracted state has been completed.

In the present embodiment, the shifting of the light shield plate 24 to the retracted state is completed when the first rotation roller 56B comes into contact with the end surface 26F of the first slide guide 26 and the second rotation roller 58B comes into contact with the end surface 28F of the second slide guide 28. In this state, the first and second rotation rollers 56B and 58B come into contact with the end surfaces 26F and 28F before the first and second drive gears 56A and 58A reach the vehicle rear side stroke ends of the meshing surfaces 26A and 28A of the first and second slide guides 26 and 28. This prevents the first and second drive gears 56A and 58A from getting caught.

In the same manner as described above, the controller 16 thereafter sets the light shield plate 24 in the retracted state as shown in FIG. 11A when incident light enter areas that are not within the vertical light shield range A or when incident light enters the third vertical light shield range A3, and sets the light shield plate 24 in the half extended state as shown in FIG. 11B when incident light enters the second vertical light shield range A2. The controller 16 sets the light shield plate 24 in the completely extended state as shown in FIG. 11C when incident light enters the first vertical light shield range A1. In this manner, the vehicle sun visor apparatus 10 of the present embodiment moves the light shield body 5 forward by a different amount in accordance with the incident angle of incident light in the vertical direction.

When the incident angle of incident light entering the vertical light shield range A changes frequently due to changes in the driving condition of the vehicle, it is preferable that the position of the light shield plate 24 be changed when the incident angle of incident light becomes substantially fixed for a certain period of time (when the incident angle of light is stabilized).

The vehicle sun visor apparatus 10 of the first embodiment has the advantages described below.

(1) The light shield body 5 is supported by the three pairs of supports, namely, the first and second drive wheels 56 and 58, the upper auxiliary rollers 48 and 52, and the lower auxiliary rollers 50 and 54 in a manner that movement of the light shield body 5 in the movement direction is permitted and movement of the light shield body 5 in the vertical direction is prevented. The vehicle sun visor apparatus 10 does not include, for example, holders that are elongated and extend throughout the range in which the light shield body 5 is movable. Thus, the vehicle sun visor apparatus 10 is reduced in size in the longitudinal direction of the vehicle. Further, this eliminates the need for long holders to securely support the light shield body at arbitrary positions in the movement range of the light shield body 5. Thus, the vehicle sun visor apparatus 10 is light. This facilitates the arrangement of the vehicle sun visor apparatus 10 in the roof portion 98.

(2) The contact portions 56C and 58C of the first and second drive wheels 56 and 58, which face each other, come into contact with the side surfaces 26B and 28B, which face opposite directions and which serves as a pair of connecting surfaces of the light shield body 5. Thus, the light shield body 5 is prevented from being displaced in the direction perpendicular to the movement direction, that is, in the widthwise direction of the light shield body 5, during forward and rearward movement of the light shield body 5.

(3) When a vehicle sun visor apparatus uses holders in the same manner as in the prior art and if the light shield body 5 is curved as in the present embodiment, the holders must be curved in correspondence with the curved shape of the light shield body 5. Further, the curved shape of the holders varies depending on the type of vehicle in which the apparatus is to be installed. In this case, the holders must be curved accurately in accordance with the shape of the light shield body 5. If the holders are not accurately curved, the holders may interfere with the movement of the light shield body 5. Accurate curving of the long holder in correspondence with the shape of the light shield body 5 increases the manufacturing cost and time. In the present embodiment, the light shield body 5 is supported by the first and second drive wheels 56 and 58, the upper auxiliary rollers 48 and 52, and the lower auxiliary rollers 50 and 54. It is thus only required that the positions of these rollers be adjusted with respect to the first and second brackets 40 and 42. This prevents the manufacturing cost and time from increasing.

(4) The light shield body 5 includes the light shield plate 24 for shielding incident light and the first and second slide guides 26 and 28 serving as frame members arranged on the rim of the light shield plate 24. The meshing surfaces 26A and 28A and the side surfaces 26B and 28B are not formed in the light shield plate 24 but are formed in the first and second slide guides 26 and 28. This prevents the light shield plate 24 from having a complex shape. As a result, the light shield plate 24 resists deformation during its formation.

(5) The light shield body 5 moves forward and rearward using the driving force transmitted to the light shield body 5 via the first and second drive gears 56A and 58A, which are meshed with the meshing surfaces 26A and 28A of the first and second slide guides 26 and 28. The transmission of the driving force through the meshing prevents the first and second drive wheels 56 and 58 from rotating idly with respect to the light shield body 5.

(6) The upper auxiliary rollers 48 and 52 and the lower auxiliary rollers 50 and 54 rotate in accordance with the forward and rearward movement of the light shield body 5.

More specifically, the upper auxiliary rollers 48 and 52 and the lower auxiliary rollers 50 and 54 do not apply a force that shields movement of the light shield body 5. This prevents the load applied to the drive motor 30 from increasing and enables the drive motor 30 to be reduced in size. As a result, the vehicle sun visor apparatus 10 is reduced in size. As compared with the structure in which holders supporting the light shield body 5 do not rotate, noise (sliding noise) generated during forward and rearward movement of the light shield body 5 is reduced. The upper auxiliary rollers 48 and 52 and the lower auxiliary rollers 50 and 54 that are made of rubber further reduce noise generated during forward and rearward movement of the light shield body 5. Further, the upper auxiliary rollers 48 and 52 and the lower auxiliary rollers 50 and 54 that are made of rubber absorb vibration generated during movement of the light shield body 5 and reduce vibration generated in the vehicle sun visor apparatus 10.

(7) In the vehicle sun visor apparatus 10 of the first embodiment, the first and second drive gears 56A and 58A, which are rotated by the drive motor 30, are meshed with the meshing surfaces 26A and 28A of the first and second slide guides 26 and 28, which are arranged to extend in the movement direction of the light shield plate 24.

When the vehicle sun visor apparatus 10 is stopped, the first and second drive gears 56A and 58A and the meshing surfaces 26A and 28A of the first and second slide guides 26 and 28 are meshed with each other. In this case, the drive motor 30 and a gear reduction mechanism (the first gear 34 and the second gear 38) serve as a load. An external force applied due to the weight of the light shield plate 24 or due to the inertial force acting on the light shield plate 24 may cause unintentional forward or rearward movement of the light shield plate 24 although the drive motor 30 is stopped. However, the drive motor 30 and the gear reduction mechanism prevent such unintentional movement of the light shield plate 24.

(8) In the first embodiment, the first and second drive gears 56A and 58A, which are rotated by the drive motor 30, are engaged with the meshing surfaces 26A and 28A of the first and second slide guides 26 and 28, which are rotated by the drive motor 30. The meshing of the gears transmits the driving force to move the light shield plate 24 forward or rearward.

This ensures transmission of the driving force from the drive motor 30 to the light shield plate 24 as compared with, for example, the unreliable transmission of driving force using frictional force between a drive pulley and a driven pulley. This prevents the occurrence of deficiencies in which the light shield plate 24 cannot be moved forward or rearward even though the drive motor 30 is producing rotation due to an external force such as the weight or inertial force of the light shield plate 24.

(9) In the present embodiment, the first and second slide guides 26 and 28 have the first roll surfaces 26C and 28C that are arranged together with the meshing surfaces 26A and 28A. The first and second rotation rollers 56B and 58B come into contact with the first roll surfaces 26C and 28C so that the first and second slide guides 26 and 28 move forward and rearward in a stable manner. This ensures that the meshing between the meshing surfaces 26A and 28A of the first and second drive gears 56A and 58A is ensured.

(10) The first and second rotation rollers 56B and 58B come into contact with the end surfaces 26F and 28F that are formed adjacent to the first roll surfaces 26C and 28C before the first and second drive gears 56A and 58A reach the front ends of the meshing surfaces 26A and 28A. This prevents, for example, the gear teeth of the first and second drive gears 56A and 58A from riding onto the flat parts of the first and second slide guides 26 and 28 at the front side of the meshing surfaces 26A and 28A when the light shield plate 24 is retracted into the roof portion 98. As a result, the gear teeth of the first and second drive gears 56A and 58A are prevented from being damaged. In other words, this prevents the gear teeth of the first and second drive gears 56A and 58A from getting caught.

In the same manner, the first and second rotation rollers 56B and 58B come into contact with the end surfaces 26G and 28G that are formed adjacent to the first roll surfaces 26C and 28C before the first and second drive gears 56A and 58A reach the rear ends of the meshing surfaces 26A and 28A. This prevents, for example, the gear teeth of the first and second drive gears 56A and 58A from riding onto the flat parts of the first and second slide guides 26 and 28 at the rear side of the meshing surfaces 26A and 28A when the light shield plate 24 is moved in the completely extended state. As a result, the gear teeth of the first and second drive gears 56A and 58A are prevented from being damaged. In other words, this structure prevents the gear teeth of the first and second drive gears 56A and 58A from getting caught.

(11) The first and second drive wheels 56 and 58 are formed as stepped drive wheels as shown in FIGS. 8 and 9. In detail, the outer diameter of a circle along the distal ends of the teeth of the first and second drive gears 56A and 58A is smaller than the outer diameter of each of the first and second rotation rollers 56B and 58B. The meshing surfaces 26A and 28A of the first and second slide guides 26 and 28 and the first roll surfaces 26C and 28C form stepped portions for holding therebetween the side surfaces 26B and 28B, which extend in the movement direction of the light shield plate 24.

Accordingly, the first and second drive wheels 56 and 58 that are formed in such stepped shapes enable the first and second drive wheels 56 and 58 to downsize its contact portions 56C and 58C. The contact portions 56C and 58C prevent the light shield plate 24 from moving in the direction perpendicular to the movement direction of the light shield plate 24 (in the widthwise direction).

(12) In the present embodiment, the first and second slide guides 26 and 28 are arranged at the peripheral portion of the light shield plate 24 in the widthwise direction. The first and second drive gears 56A and 58A are meshed with the meshing surfaces 26A and 28A of the first and second slide guides 26 and 28. The first and second drive gears 56A and 58A are fixed to the single rotation shaft 60 and rotated in synchronization by the drive motor 30. Thus, the light shield plate 24 smoothly moves forward and rearward in the movement direction without being deformed. This prevents vibration or noise from being generated during forward and rearward movement of the light shield plate 24.

(13) In the present embodiment, the first and second drive gears 56A and 58A and the first and second rotation rollers 56B and 58B are supported coaxially on the first and second brackets 40 and 42, which are fixed to the vehicle body. As compared with a structure in which the first and second drive gears 56A and 58A and the first and second rotation rollers 56B and 58B are separately set on the first and second brackets 40 and 42, the vehicle sun visor apparatus 10 of the first embodiment has a simple structure for axially supporting the first and second drive gears 56A and 58A and the first and second rotation rollers 56B and 58B. This reduces the components and the assembling steps of the vehicle sun visor apparatus 10 thereby reducing the cost of the vehicle sun visor apparatus 10.

(14) In the present embodiment, the first drive gear 56A and the first rotation roller 56B are formed integrally using a resin material. This reduces the components of the vehicle sun visor apparatus 10. Further, as compared with the structure in which the first drive gear 56A and the first rotation roller 56B are not supported coaxially, the axial supporting structure is simplified. This reduces the assembling steps of the vehicle sun visor apparatus 10 and simplifies the structure of the vehicle sun visor apparatus 10.

(15) In the present embodiment, the output shaft 36 of the drive unit 20 supports the first drive gear 56A and the first rotation roller 56B. In other words, the first drive gear 56A and the first rotation roller 56B use the same supporting structure as the output shaft 36 of the drive unit 20. This reduces the components and the assembling steps of the vehicle sun visor apparatus 10 and simplifies the structure of the vehicle sun visor apparatus 10.

(16) In the preferred embodiment, the front ends of the meshing surfaces 26A and 28A of the first and second slide guides 26 and 28 coincide with the front ends of the first roll surfaces 26C and 28C in the movement direction of the light shield plate 24. This improves the appearance of the meshing surfaces 26A and 28A and the first roll surfaces 26C and 28C. This is preferable because the front ends of the meshing surfaces 26A and 28A and the first roll surfaces 26C and 28C may become visible to an occupant when the light shield plate 24 is set in the completely extended state or the half extended state.

(17) In the first embodiment, the front ends of the meshing surfaces 26A and 28A of the first and second slide guides 26 and 28 and the end surfaces 26F and 28F adjacent to the front ends of the first roll surfaces 26C and 28C function as stoppers that come into contact with the first and second rotation rollers 56B and 58B. This not only improves the appearance of the first and second slide guides 26 and 28 but also prevents the first and second drive gears 56A and 58A from riding over the flat parts. The stoppers do not project upward from the meshing surfaces 26A and 28A. This prevents the stoppers from being caught on the roof portion 98 and prevents retraction failures of the light shield plate 24.

In the same manner, the rear ends of the meshing surfaces 26A and 28A of the first and second slide guides 26 and 28 and the end surfaces 26G and 28G adjacent to the rear ends of the first roll surfaces 26C and 28C function as stoppers that come into contact with the first and second rotation rollers 56B and 58B. This simple structure prevents the first and second drive gears 56A and 58A from riding onto the flat parts.

A second embodiment of the present invention will now be described with reference to FIG. 12.

In the first embodiment, the stoppers for the first and second rotation rollers 56B and 58B are formed by the front ends of the meshing surfaces 26A and 28A of the first and second slide guides 26 and 28 and the end surfaces 26F and 28F that are adjacent to the front ends of the first roll surfaces 26C and 28C.

Figure 12:
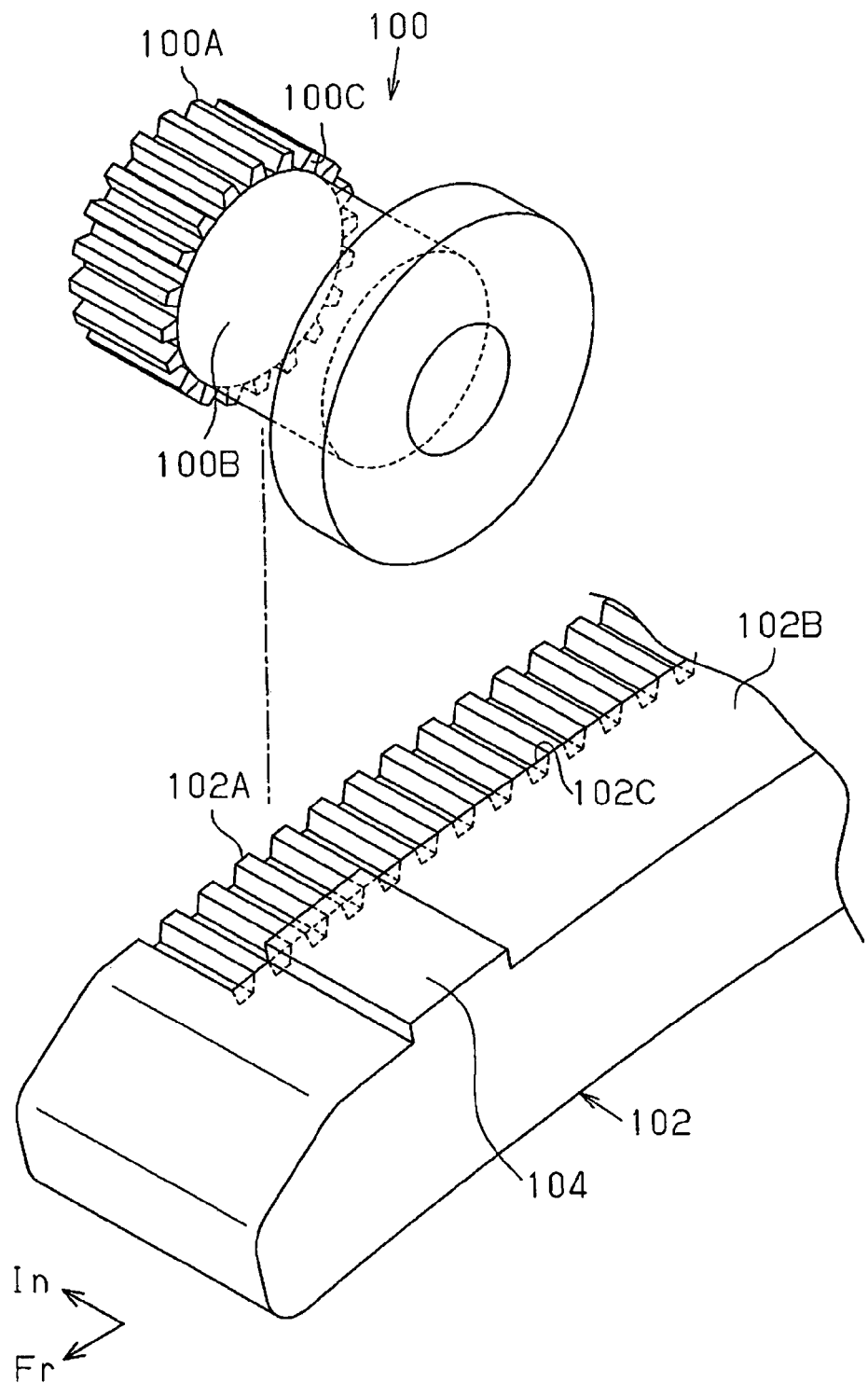
FIG. 12 is a perspective view showing a drive wheel and a slide guide according to a second embodiment of the present invention.

In the second embodiment shown in FIG. 12, the outer diameter of a circle at the bottom of the teeth of a first drive gear 100A of a first drive wheel 100 is set equal to the outer diameter of a first rotation roller 100B. A meshing surface 102A (teeth distal portion) of a first slide guide 102 is flush with a first roll surface 102B.

A projected stopper 104 is formed on the stroke end portion of the first roll surface 102B. The meshing surface 102A is formed to extend toward the front of the vehicle from the first roll surface 102B (stopper 104). The stopper 104 comes into contact with the first rotation roller 100B before the first drive gear 100A reaches the front end of the meshing surface 102A. Such a projected stopper may also be formed at the rear end of the first roll surface 102B.

A second drive wheel having the same structure as the first drive wheel 100 is arranged symmetric to the first drive wheel 100. A second slide guide having the same structure as the first slide guide 102 is arranged symmetric to the first slide guide 102. More specifically, a side surface of the first roll surface 102B facing toward the meshing surface 102A of the first roll surface 102B is a side surface 102C facing the side surface of the second drive wheel. A contact portion 100C that is formed by a side surface of the first drive gear 100A adjacent to the first rotation roller 100B comes into contact with the side surface 102C. The contact portion 100C coming into contact with the side surface 102C prevents a light shield body 5 from being displaced in the direction perpendicular to its movement direction.

Figure 13:
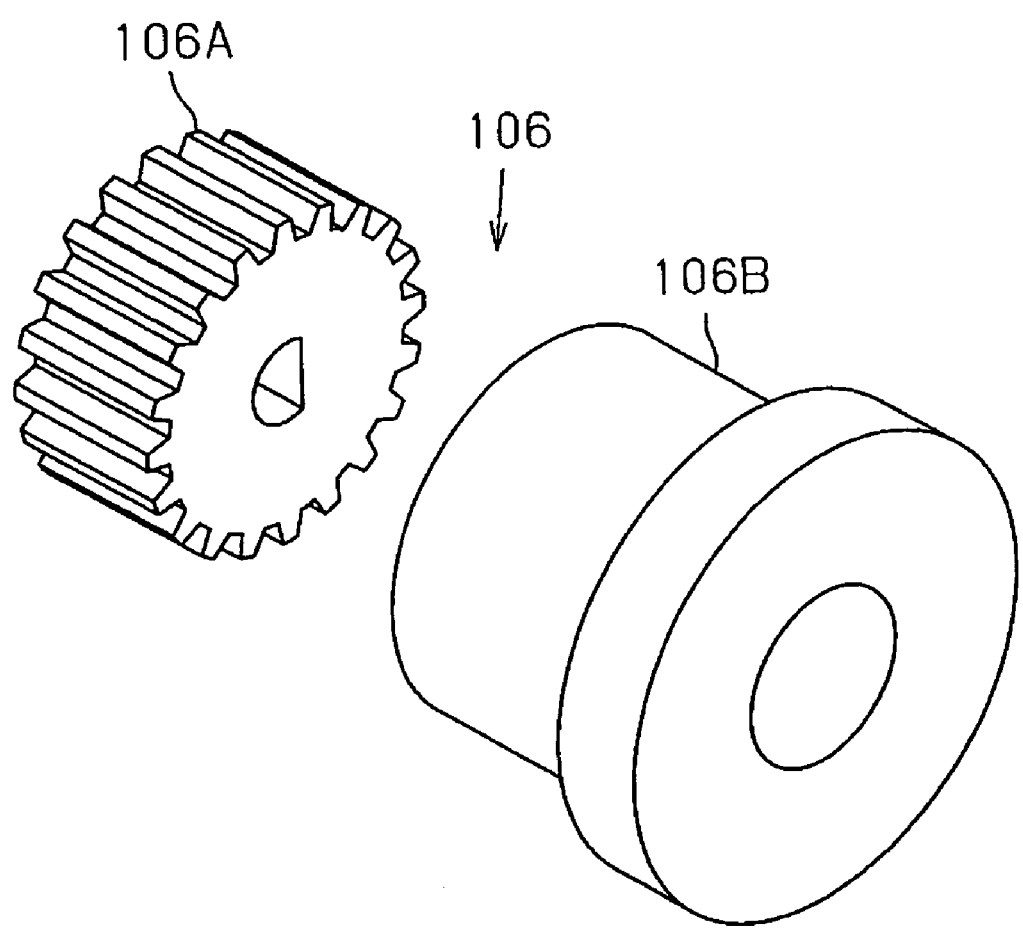
FIG. 13 is an exploded perspective view showing a drive wheel according to a third embodiment of the present invention.

FIG. 13 shows a third embodiment of the present invention.

In the first embodiment, the first drive gear 56A and the first rotation roller 56B are formed integrally. A drive wheel 106 shown in FIG. 13 includes a first drive gear 106A and a first rotation roller 106B that are formed as separate members. In this case, it is preferable that the first rotation roller 106B include an elastic material and that a circumferential surface of the first rotation roller 106B that comes into contact with a first roll surface 26C of a first slide guide 26 be formed on the elastic material.

The third embodiment has the advantages described below.

(18) The first drive gear 106A and the first rotation roller 106B are formed as separate members. In this case, the first drive gear 106A may be formed from a resin material or a metal material ensuring transmission of drive force, and the first rotation roller 106B may be formed from an elastic material. This structure not only ensures the transmission of the drive force of the drive motor 30 to a meshing surface 26A of the first slide guide 26 but also reduces noise and impact generated when a stopper of the first slide guide 26 comes into contact with the first rotation roller 106B at a high level.

FIGS. 14 to 16 show a fourth embodiment of the present invention. The structure of the second embodiment includes an engagement clutch CL1. The engagement clutch CL1 disengages a first drive gear 108A from a first rotation roller 108B when an external force of a predetermined value or greater is applied to a light shield plate 24.

Figure 15A:
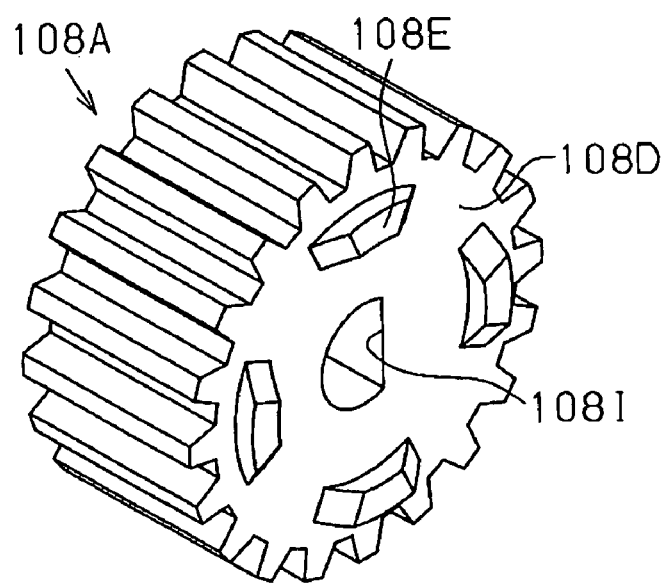
FIG. 15A is a perspective view showing the drive gear shown in FIG. 14.
Figure 16A:
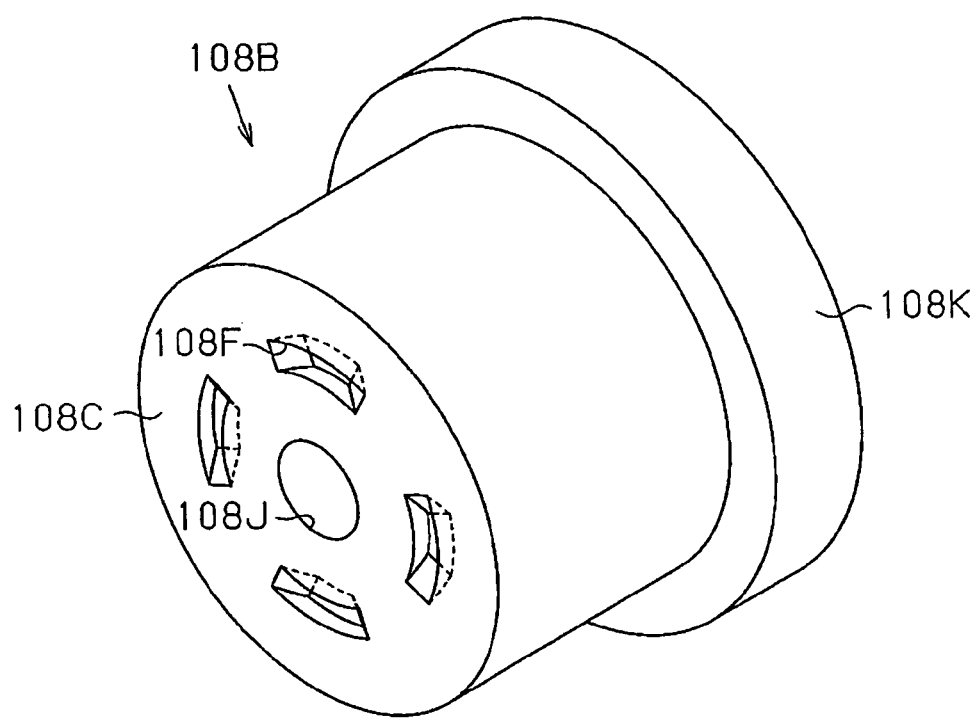
FIG. 16A is a perspective view showing the rotation roller shown in FIG. 14.

More specifically, an end surface 108D of the first drive gear 108A facing toward the first rotation roller 108B includes a plurality of (four) engagement projections 108E arranged in the circumferential direction as shown in FIG. 15A. The engagement projections 108E project axially toward the first rotation roller 108B. An end surface 108C of the first rotation roller 108B facing toward the first drive gear 108A includes a plurality of (four) engagement recesses 108F arranged in the circumferential direction as shown in FIG. 16A. The engagement recesses 108F may be engaged with the engagement projections 108E. The engagement projections 108E and the engagement recesses 108F function as a first engagement part and a second engagement part that are engaged with each other based on a concavo-convex relationship.

Figure 15B:
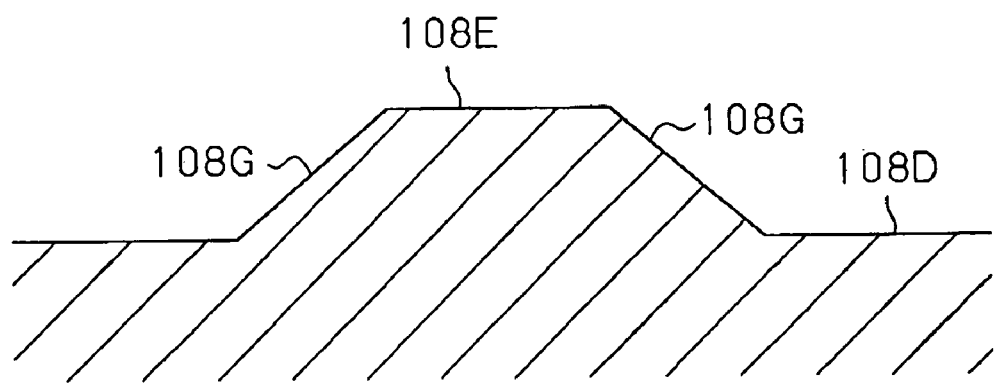
FIG. 15B is a cross-sectional view of an engagement projection of the drive gear of FIG. 15A.
Figure 16B:
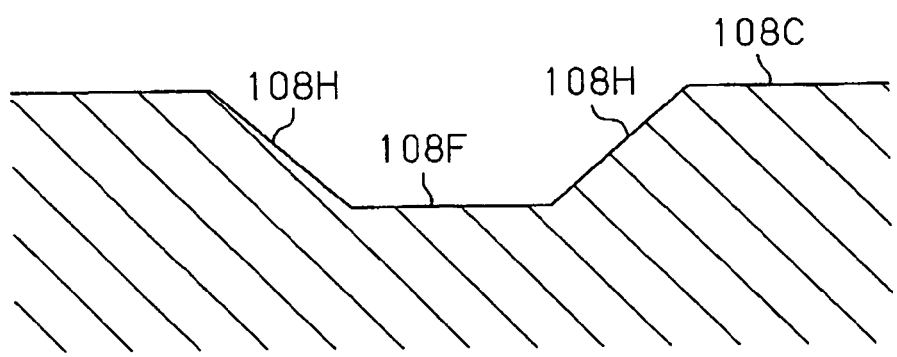
FIG. 16B is a cross-sectional view of an engagement recess of the rotation roller of FIG. 16A.

As shown in FIG. 15B, each engagement projection 108E of the first drive gear 108A has an inclined surface 108G at each of its two sides in the circumferential direction. The inclined surface 108G is inclined in the circumferential direction. As shown in FIG. 16B, each engagement recess 108F of the first rotation roller 108B has an inclined surface 108H at each of its two sides in the circumferential direction. The inclined surface 108H is inclined in the circumferential direction.

A hole 108I extends through the center of the first drive gear 108A. The hole 108I has a D-shaped cross-section. A D-cut portion 60A, which has a D-shaped cross-section, is formed at one end of a rotation shaft 60. The D-cut portion 60A is inserted through the hole 108I so that the rotation shaft 60 engages with the first drive gear 108A in the circumferential direction. When the D-cut portion 60A is inserted through the hole 108I, the first drive gear 108A is restricted from rotating about its axis relative to the rotation shaft 60 while movement in the axial direction is enabled until coming into contact with a stopper 60B of the rotation shaft 60.

The first rotation roller 108B has a recess 108J at the side of the first drive gear 108A. The recess 108J has a circular cross-section. The D-cut portion 60A of the rotation shaft 60 is inserted into the recess 108J. The insertion of the D-cut portion 60A in the recess 108J enables rotation of the first rotation roller 108B about its axis relative to the rotation shaft 60 and enables movement in the axial direction.

A flange 108K of the first rotation roller 108B has a projection 108L projecting from the surface facing toward an output shaft 36. The projection 108L projects toward the output shaft 36. The projection 108L has a recess 108M, which has a D-shaped cross-section. A D-cut portion 36A, which has a D-shaped cross-section, is formed at one end of the output shaft 36. The D-cut portion 36A of the output shaft 36 is inserted into the recess 108M of the first rotation roller 108B so that the output shaft 36 engages the first rotation roller 108B in the circumferential direction. The insertion of the D-cut portion 36A into the recess 108M causes the first rotation roller 108B to function as a rotational body that is connected to the output shaft 36 so that rotation of the first rotation roller 108B about its axis relative to the output shaft 36 is restricted and movement in the axial direction is enabled until the bottom of the recess 108M comes into contact with the projected end of the output shaft 36.

A washer 68 and a plate spring 70 are set on the projection 108L of the first rotation roller 108B. The plate spring 70 presses the flange 108K of the first rotation roller 108B against the washer 68 that comes into contact with a first bracket 40 and urges the entire first rotation roller 108B toward the first drive gear 108A.

When the entire first rotation roller 108B is urged toward the first drive gear 108A by the plate spring 70, the engagement recesses 108F of the first rotation roller 108B are engaged with the engagement projections 108E of the first drive gear 108A. The drive gear 108A is prevented from moving in the axial direction due to contact with the stopper 60B. As a result, the first drive gear 108A is engaged with the first rotation roller 108B, and rotates integrally with the first rotation roller 108B.

When an external load of a predetermined value or greater, with the external load being greater than the drive load applied to the light shield plate 24 when the drive unit 20 is being driven, may be applied to the light shield plate 24. This moves the inclined surfaces 108G of the engagement projections 108E relative to the inclined surfaces 108H of the engagement recesses 108F in the circumferential direction. In other words, the first drive gear 108A is separated from the first rotation roller 108B.

In this state, movement of the first drive gear 108A in the axial direction is restricted due to contact with the stopper 60B. Thus, the plate spring 70 permits the first rotation roller 108B to be separated from the first drive gear 108A to disengage the first drive gear 108A and the first rotation roller 108B.

Accordingly, the first rotation roller 108B moves relative to the first drive gear 108A in the axial direction against the urging force of the spring 70. The first drive gear 108A is prevented from moving in the axial direction due to contact with the stopper 60B. Thus, the first drive gear 108A and the first rotation roller 108B are disengaged from each other.

The fourth embodiment has the advantages described below.

(19) The engagement clutch CL1 disengages the first drive gear 108A and the first rotation roller 108B. The engagement clutch CL1 cancels the engagement between the drive unit 20 and the light shield plate 24 so that the light shield plate 24 can be manually moved forward or rearward quickly.

Figure 17:
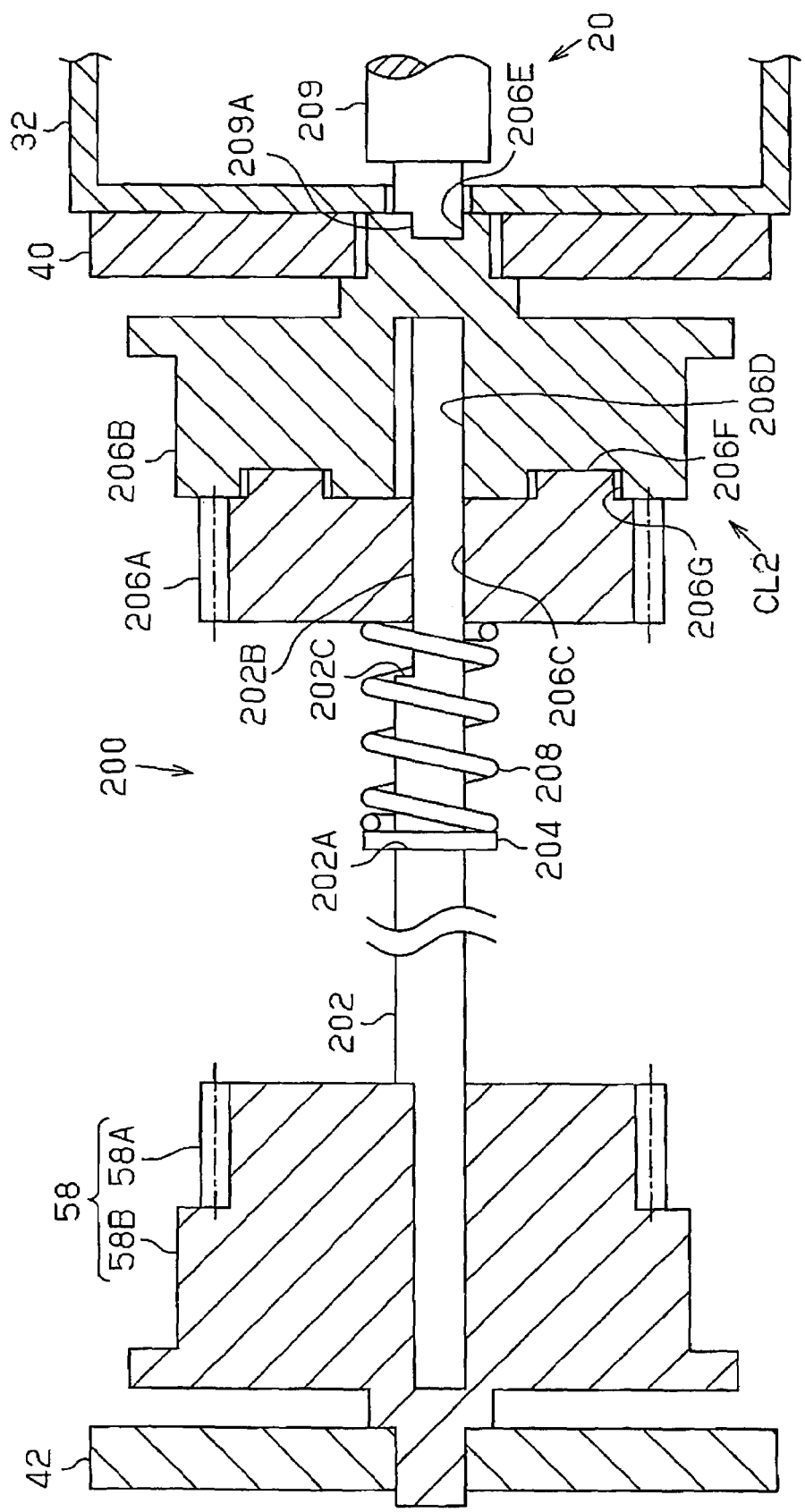
FIG. 17 is a cross-sectional view showing an actuation mechanism according to a fifth embodiment of the present invention.

FIG. 17 shows a fifth embodiment of the present invention.

In the fourth embodiment, the engagement clutch CL1 for engaging the first drive gear 108A and the first rotation roller 108B urges the first rotation roller 108B toward the first drive gear 108A with the plate spring 70. The engagement clutch may be changed in the manner described below.

An engagement clutch CL2 of an actuation mechanism 200 shown in FIG. 17 includes a C-ring 204, which is fixed to a groove 202A formed in a longitudinally middle portion of a rotation shaft 202. A coil spring 208, which is a compression spring, is set on the rotation shaft 202 at a position closer to a first drive gear 206A than the C-ring 204.

A D-cut portion 202B of the rotation shaft 202 is inserted through a hole 206C of the first drive gear 206A having a D-shaped cross-section. The insertion of the D-cut portion 202B through the hole 206C restricts rotation of the first drive gear 206A about its axis relative to the rotation shaft 202 and enables movement in the axial direction until coming into contact with a stopper 202C of the rotation shaft 202. The D-cut portion 202B of the rotation shaft 202 is inserted into a recess 206D of the first rotation roller 206B having a circular cross-section. The insertion of the D-cut portion 202B into the recess 206D enables rotation of the first rotation roller 206B about its axis relative to the rotation shaft 202. Further, a D-cut portion 209A of an output shaft 209 of a drive unit 20 is inserted into a recess 206E of the first rotation roller 206B having a D-shaped cross-section. The insertion of the D-cut portion 209A into the recess 206E connects the first rotation roller 206B to the output shaft 209 so as to restrict rotation of the first rotation roller 206B relative to the output shaft 209.

The coil spring 208 urges the entire first drive gear 206A toward the C-ring 204, which is fixed to the rotation shaft 202, relative to the first rotation roller 206B. In this manner, the entire first drive gear 206A is pressed toward the first rotation roller 206B by the coil spring 208 so that fitting protrusions 206F of the first drive gear 206A are engaged with fitting recesses 206G of the first rotation roller 206B. As a result, the first drive gear 206A and the first rotation roller 206B are engaged with each other and rotate integrally.

If an external load greater by a predetermined value than the drive load applied to the light shield plate 24 when the drive unit 20 is being driven is applied to the light shield plate 24, the coil spring 208 permits the first drive gear 206A to be separated from the first rotation roller 206B to disengage the first drive gear 206A and the first rotation roller 206B. As a result, the first drive gear 206A moves in the axial direction against the pressing force applied by the coil spring 208, that is, in the direction that separates the first drive gear 206A from the first rotation roller 206B. Thus, the first drive gear 206A and the first rotation roller 206B are disengaged from each other.

The fifth embodiment has the advantages described below.

(20) The engagement clutch CL2 uses the coil spring 208 as an urging portion. This maintains the urging force for urging the first drive gear 206A toward the first rotation roller 206B for a long period of time. In other words, the spring characteristic is stable for a long period of time. If the spring characteristic is not stable, the first drive gear 206A and the first rotation roller 206B may be unintentionally disengaged from each other by a load smaller than the driving load, and the light shield plate 24 may fail to move forward or rearward when the light shield plate 24 is electrically driven after repeated manual operations of the light shield plate 24. However, the engagement clutch CL2 having the stable spring characteristic prevents such unintentional failure during movement of the light shield plate 24.

Figure 18:
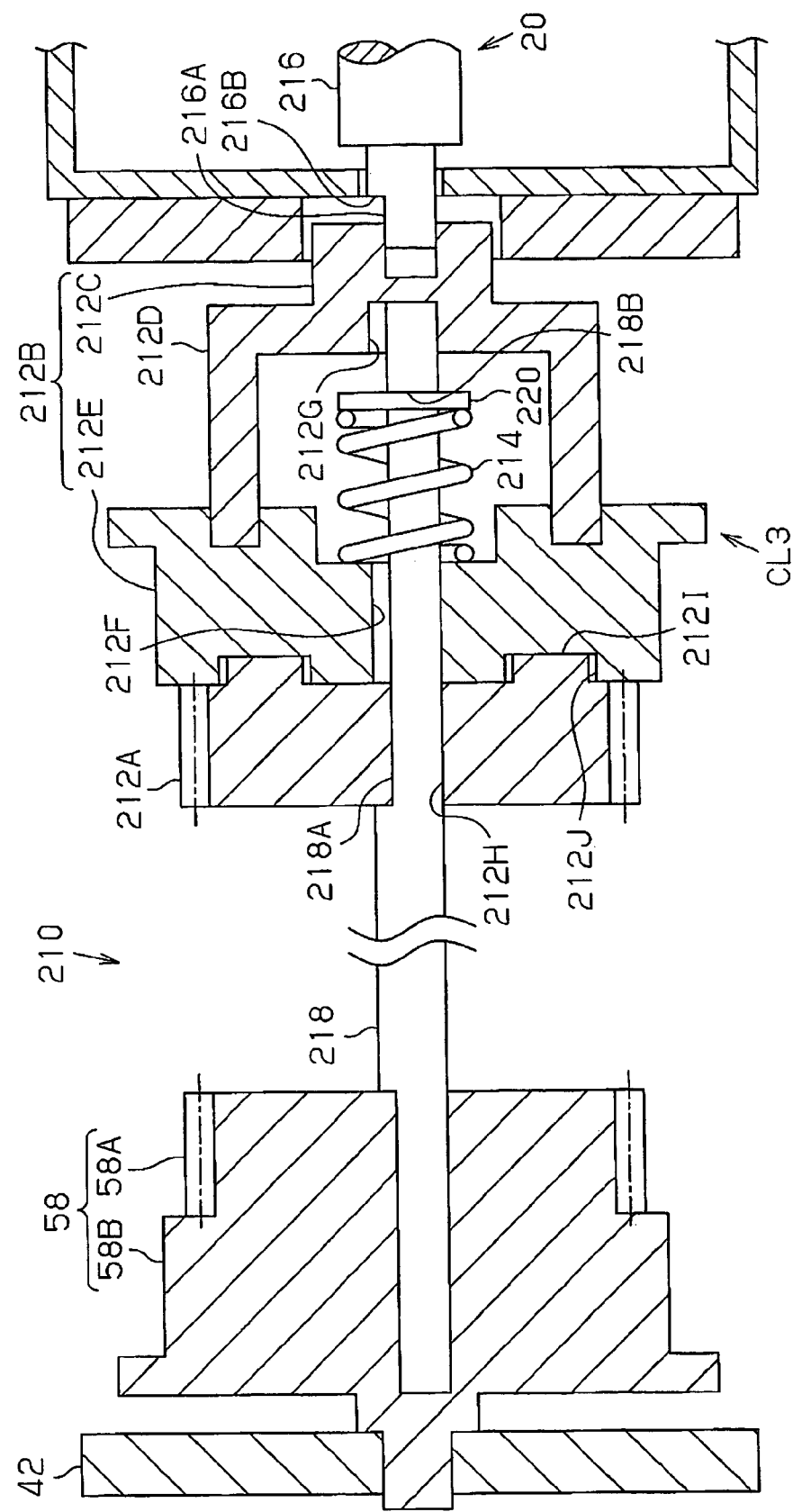
FIG. 18 is a cross-sectional view showing an actuation mechanism according to a sixth embodiment of the present invention.

FIG. 18 shows a sixth embodiment of the present invention.

An engagement clutch CL3 of an actuation mechanism 210 shown in FIG. 18 has a spring 214, which is accommodated in a first rotation roller 212B. The spring 214 urges the entire first rotation roller 212B toward a first drive gear 212A. More specifically, the first rotation roller 212B includes a connecting portion 212C and a roller portion 212E. The connecting portion 212C is connected to a D-cut portion 216A of an output shaft 216 in a drive unit 20 so as to restrict rotation and axial movement of the connecting portion 212C relative to the output shaft 216. The roller portion 212E is fixed to a supporting portion 212D that extends from the connecting portion 212C and is engaged with the first drive gear 212A.

A D-cut portion 218A of a rotation shaft 218 is inserted through a hole 212F and into a recess 212G of the first rotation roller 212B. The insertion of the D-cut portion 218A through the hole 212F and into the recess 212G enables rotation of the first rotation roller 212B about its axis relative to the rotation shaft 218 and enables movement in the axial direction until the end surface of the connecting portion 212C comes into contact with a stopper 216B of the output shaft 216. Further, the D-cut portion 218A of the rotation shaft 218 is inserted through a hole 212H of the first drive gear 212A so as to restrict rotation of the first drive gear 212A relative to the rotation shaft 218.

The spring 214 accommodated in the first rotation roller 212B urges the entire first rotation roller 212B toward the first drive gear 212A relative to a C-ring 220, which is fixed to a groove 218B of the rotation shaft 218. In this manner, the entire first rotation roller 212B is urged toward the first drive gear 212A by the spring 214 so that fitting protrusions 212I of the first drive gear 212A are engaged with fitting recesses 212J of the first rotation roller 212B. As a result, the first drive gear 212A and the first rotation roller 212B are engaged with each other and rotate integrally.

If an external load greater by a predetermined value than the drive load applied to the light shield plate 24 when the drive unit 20 is being driven may be applied to the light shield plate 24, the spring 214 permits the first drive gear 212A to be separated from the first rotation roller 212B to disengage the first drive gear 212A and the first rotation roller 212B.

As a result, the first rotation roller 212B moves in the axial direction against the urging force applied by the spring 214, that is, in the direction that separates the first rotation roller 212B from the first drive gear 212A. As a result, the first drive gear 212A and the first rotation roller 212B are disengaged from each other. In this manner, the spring 214 may be accommodated in the first rotation roller 212B and press the entire first rotation roller 212B toward the first drive gear 212A.

In the above embodiments, the first drive gear 108A includes the engagement projections 108E and the first rotation roller 108B includes the engagement recesses 108F. However, the first drive gear 108A may include engagement recesses and the first rotation roller 108B may include engagement projections.

In the above embodiments, each engagement projection 108E has the inclined surface 108G at each of its two ends in the circumferential direction and each engagement recess 108F has the inclined surface 108H at each of its two ends in the circumferential direction. However, each engagement projection 108E may have an inclined surface 108G only at one of the ends in the circumferential direction, and each engagement recess 108F may have an inclined surface 108H only at one of the ends in the circumferential direction.

In the above embodiments, the second drive gear 58A and the second rotation roller 58B of the second drive wheel 58 are formed integrally. However, the present invention is not limited in this manner. The second drive gear 58A and the second rotation roller 58B may be formed as separate members in the same manner as the first drive wheel 108.

In the above embodiments, the light shield plate 24 is electrically driven to move forward and rearward based on the incident light detection signals S1 and S2 output from the light receiving sensor 12 when the activation switch 62 is turned on. However, the present invention is not limited in this manner. For example, any adjustment switch for operating the drive motor 30 may be arranged in the passenger compartment, and the controller 16 may drive the drive motor 30 based on a signal output from the adjustment switch to move the light shield plate 24 forward or rearward.

Further, in the above embodiments, the drive unit 20 is arranged only on the first bracket 40. However, the present invention is not limited in such a manner. For example, a pair of drive units 20 may be respectively arranged at the two sides of the light shield plate 24 in the widthwise direction, and the drive units 20 may be electrically driven in synchronization. As a result, the first and second slide guides, 26 and 28 are driven respectively by the two drive units 20 to move the first and second slide guides 26 and 28 forward or rearward. In this case, the engagement clutch CL1 may be arranged for each of the two drive units 20. This eliminates the need for connecting the first and second drive wheels 56 and 58 with the single rotation shaft 60 as in the above embodiments because the first and second drive wheels 56 and 58 are respectively rotated by the two drive units 20. This structure is advantageous when the light shield plate 24 is relatively large in the widthwise direction.

Figure 19:
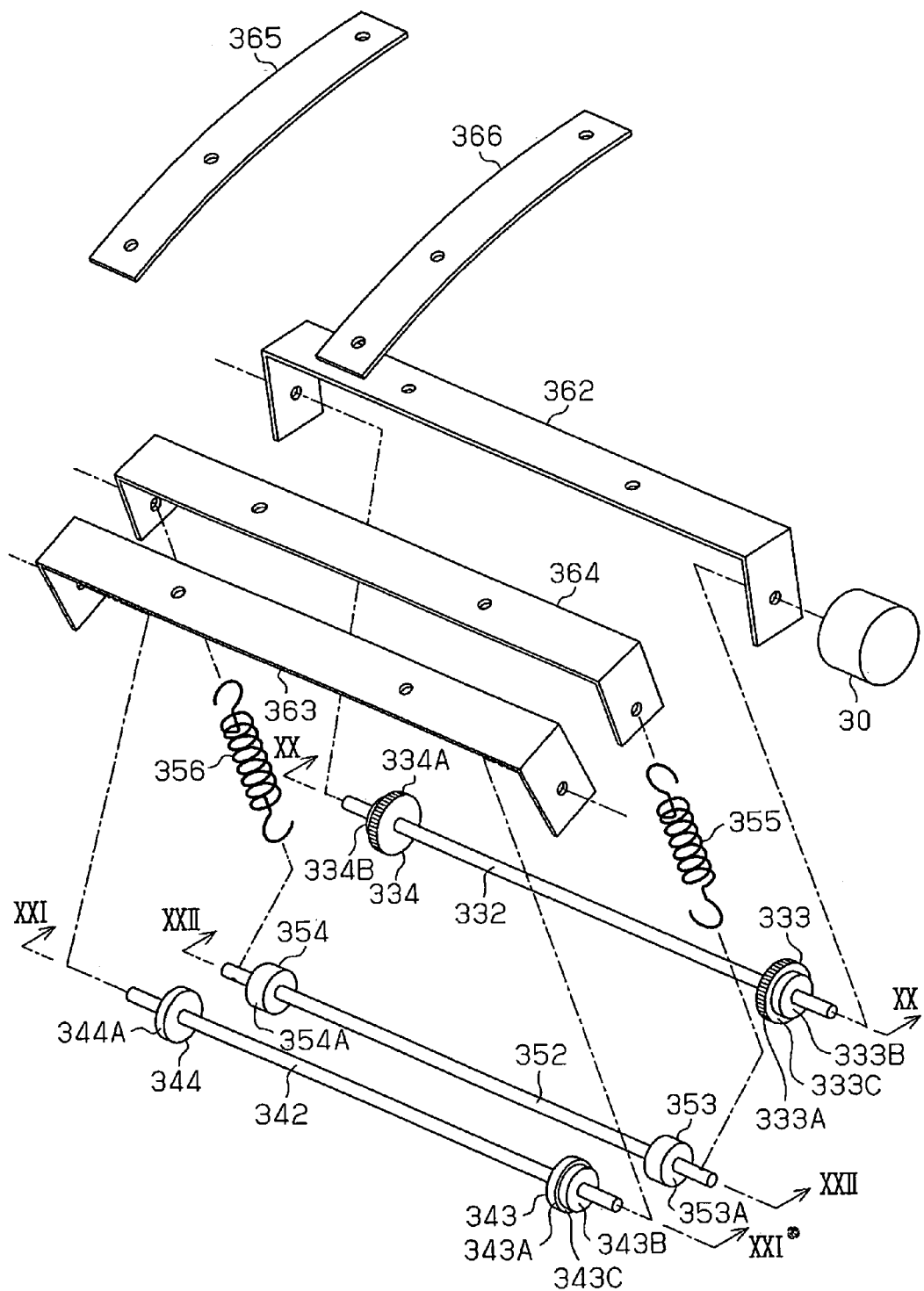
FIG. 19 is an exploded perspective view showing an actuation mechanism according to a seventh embodiment of the present invention.
Figure 20:
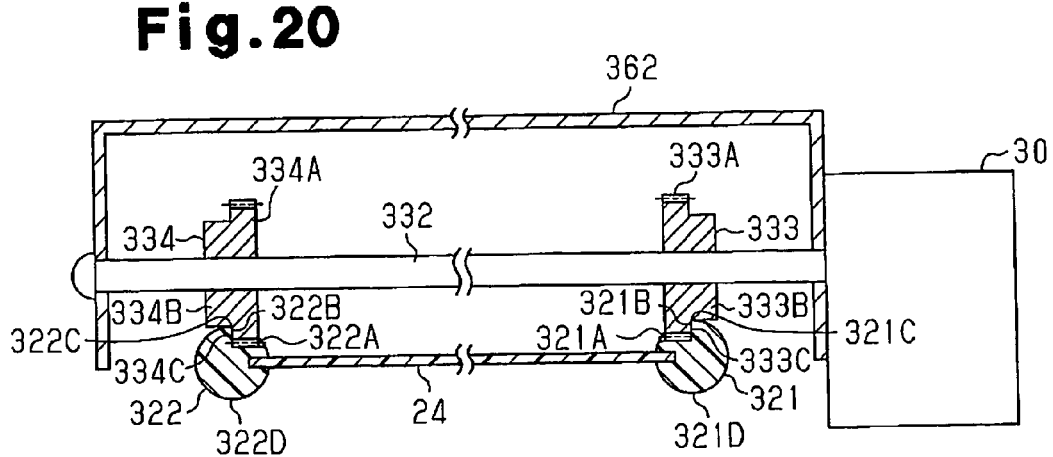
FIG. 20 is a cross-sectional view taken along line XX—XX in FIG. 19.
Figure 21:
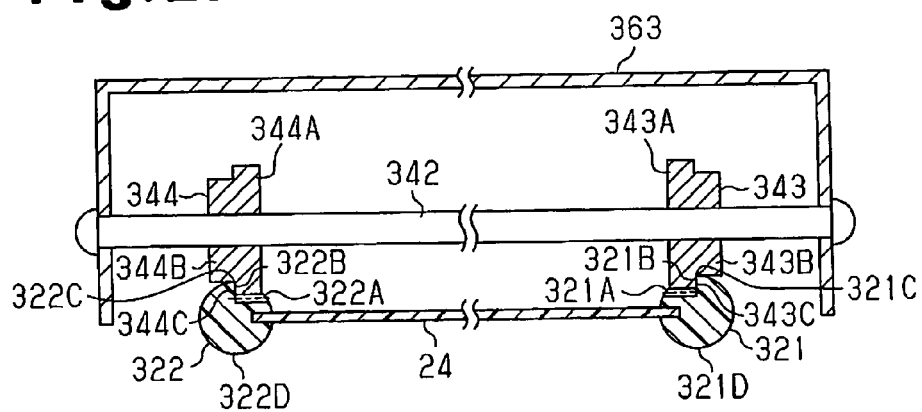
FIG. 21 is a cross-sectional view taken along line XXI—XXI in FIG. 19.
Figure 22:
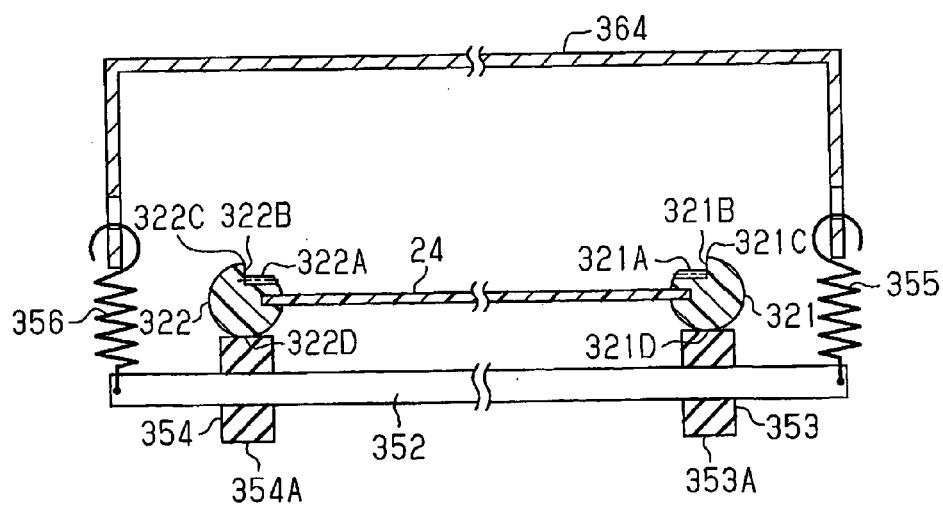
FIG. 22 is a cross-sectional view taken along line XXII—XXII in FIG. 19.

FIGS. 19 to 22 show a seventh embodiment of the present invention. As shown in FIGS. 20 to 22, first and second slide guides 321 and 322 are cylindrical and have stepped portions extend in the longitudinal direction of the vehicle. The stepped portions have meshing surfaces 321A and 322A and side surfaces 321B and 322B, which face each other. Parts of the circumferential surfaces of the first and second slide guides 321 and 322 that are adjacent to the side surfaces 321B and 322B form first contact portions 321C and 322C. Parts of the circumferential surfaces of the first and second slide guides 321 and 322 that are opposite to the first contact portions 321C and 322C form second contact portions 321D and 322D.

As shown in FIGS. 19 and 20, first and second drive wheels 333 and 334 are fixed to a first rotation shaft 332. The first rotation shaft 332 is rotatably supported by a channel-shaped first support bracket 362. The first and second drive wheels 333 and 334, which have stepped shapes, include first and second drive gears 333A and 334A having large diameters and first and second rotation rollers 333B and 334B having small diameters, respectively. The first and second drive gears 333A and 334A have contact portions 333C and 334C facing toward the first and second rotation rollers 333B and 334B.

The first and second drive gears 333A and 334A are meshed with the meshing surfaces 321A and 322A of the first and second slide guides 321 and 322. The first and second rotation rollers 333B and 334B come into contact with the first contact portions 321C and 322C of the first and second slide guides 321 and 322. The contact portions 333C and 334C face opposite directions and come into contact with the side surfaces 321B and 322B of the first and second slide guides 321 and 322, respectively.

As shown in FIGS. 19 and 21, upper auxiliary rollers 343 and 344 are fixed to a second rotation shaft 342, and the second rotation shaft 342 is rotatably supported by a channel-shaped second support bracket 363. The upper auxiliary rollers 343 and 344, which have stepped shapes, include large-diameter portions 343A and 344A and rotation rollers 343B and 344B, serving as small-diameter portions, respectively. The large-diameter portions 343A and 344A have contact portions 343C and 344C facing toward the rotation rollers 343B and 344B.

The rotation rollers 343B and 344B come into contact with the first contact portions 321C and 322C of the first and second slide guides 321 and 322. The contact portions 343C and 344C are arranged to face opposite directions and come into contact with the side surfaces 321B and 322B of the first and second slide guides 321 and 322, respectively.

As shown in FIGS. 19 and 22, lower auxiliary rollers 353 and 354 are supported on a third rotation shaft 352 in a manner rotatable with respect to the third rotation shaft 352. The third rotation shaft 352 is supported on a channel-shaped third support bracket 364 by a pair of tension coil springs 355 and 356. The lower auxiliary rollers 353 and 354 have circumferential surfaces 353A and 354A. The circumferential surfaces 353A and 354A come into contact with the second contact portions 321D and 322D of the first and second slide guides 321 and 322.

The first to third support brackets 362 and 364 are supported on a roof portion 98 by connecting brackets 365 and 366.

The lower auxiliary rollers 353 and 354 are pulled upward (toward the roof portion 98) by the tension coil springs 355 and 356 and support a light shield body 5 from below. The upper auxiliary rollers 343 and 344 and the lower auxiliary rollers 353 and 354 rotate in accordance with the forward and rearward movement of the light shield body 5.

The first and second rotation rollers 333B and 334B, the upper auxiliary rollers 343 and 344, and the lower auxiliary rollers 353 and 354 support the light shield body 5 while the rollers are arranged to permit movement of the light shield body 5 in the movement direction and restrict movement of the light shield body 5 in the vertical direction.

The seventh embodiment has the advantages described below.

(21) The contact portions 333C and 343C of the first and second drive wheels 333 and 334 and the contact portions 343C and 344C of the upper auxiliary rollers 343 and 344 come into contact with the side surfaces 321B and 322B of the first and second slide guides 321 and 322. This ensures that the light shield body 5 is prevented from moving in the direction perpendicular to the movement direction, that is, in the widthwise direction during forward and rearward movement of the light shield body 5.

(22) The lower auxiliary rollers 343 and 354 are pulled toward the roof portion 98 by the tension coil springs 355 and 356. The tension coil springs 355 and 356 absorb vibration of the light shield body 5 in the longitudinal direction of the vehicle 80. Further, the light shield body 5 is curved in the longitudinal direction of the vehicle 80. However, the tension coil springs 355 and 356 are compressed or expanded to easily correspond with the curved shape of the light shield body 5.

The above embodiments may be modified in the following forms.

To facilitate description, the light shield body 5, which is formed by the light shield plate 24 and the first and second slide guides 321 and 322, is shown as one member in the drawings referred to hereinafter, and the first to third rotation shafts 332, 342, and 352 are not shown in the drawings.

Figure 23A:
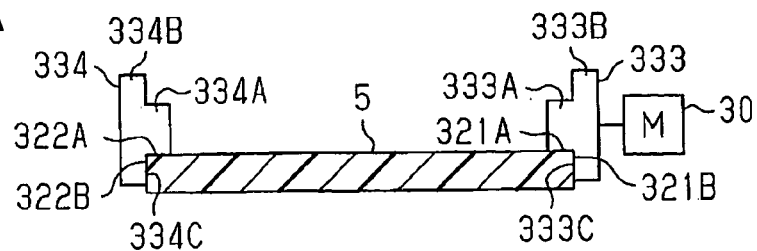
FIGS. 23A to 23B, 24A to 24B, and 25A to 25B are cross-sectional views showing modifications of the drive wheel and the slide guide.
Figure 23B:
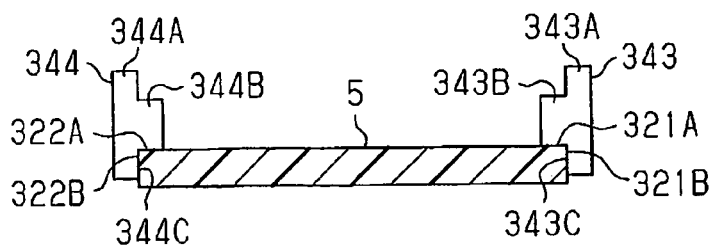

A light shield body 5 shown in FIGS. 23A and 23B do not include the stepped portions described in the above embodiments. The two end surfaces of the light shield body 5 in the widthwise direction form a pair of side surfaces 321B and 322B that are arranged to face opposite directions. First and second drive gears 333A and 334A are formed to have a smaller diameter than first and second rotation rollers 333B and 334B. The first and second rotation rollers 333B and 334B include contact portions 333C and 334C that face each other. The contact portions 333C and 334C and contact portions 343C and 344C come into contact with the side surfaces 321B and 322B and prevent the light shield body 5 from moving in the direction perpendicular to the movement direction.

Figure 24A:
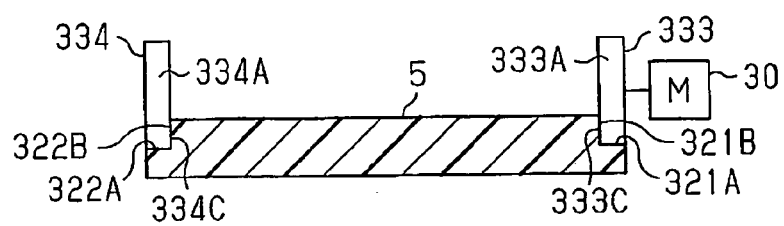
Figure 24B:
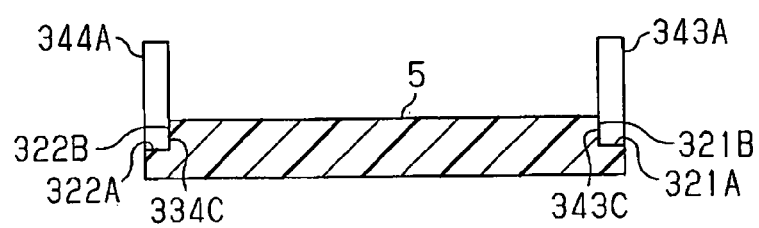

First and second drive wheels 333 and 334 shown in FIGS. 24A and 24B do not include the first and second rotation rollers 333B and 334B. Further, upper auxiliary rollers 343 and 344 do not include the rotation rollers 343B and 344B.

Figure 25A:
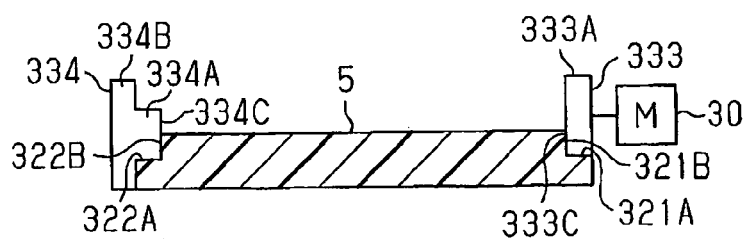
Figure 25B:
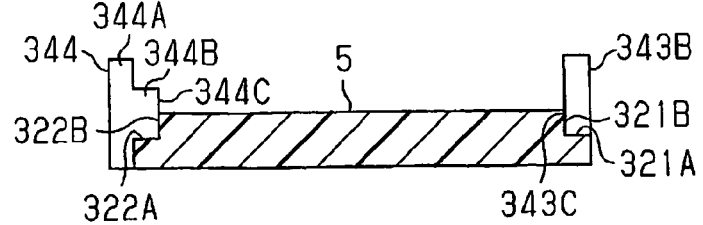

A second drive wheel 334 shown in FIGS. 25A and 25B includes a contact portion 334C formed by an end surface of a second drive gear 334A, which serves as a small-diameter portion, arranged in a direction opposite to a second rotation roller 334B, which serves as a large-diameter portion. In the same manner, a contact portion 344C of an upper auxiliary roller 344 is formed by an end surface of a rotation roller 344B, which serves as a small-diameter portion, arranged in a direction opposite to a large-diameter portion 344A.

In the above embodiments, the upper auxiliary rollers 343 and 344 and the lower auxiliary rollers 353 and 354 for supporting the light shield body 5 all rotate. However, the present invention is not limited in this manner. For example, members that do not rotate may be used such as a member enabling sliding of the light shield body 5.

In the above embodiments, the first slide guide 26 includes the meshing surface 26A and the second slide guide 28 includes the meshing surface 28A. However, only the first slide guide 26 may include the meshing surface 26A, and the second slide guide 28 may be omitted from the meshing surface 28A. In other words, the driving force of the drive motor 30 may be transmitted to the light shield body 5 only from the first drive wheel 56.

Further, only the first slide guide 26 may include the first and second roll surfaces 26C and 26D. The second slide guide 28 may be eliminated from the first and second roll surfaces 28C and 28D.

In the above embodiments, the vehicle sun visor apparatus 10 is arranged for an occupant who is seated in the driver seat 3. However, the vehicle sun visor apparatus 10 may be arranged for an occupant who is seated in a front passenger seat.

It should be apparent to those skilled in the art that the present invention may be embodied in many other specific forms without departing from the spirit or scope of the invention. Therefore, the present examples and embodiments are to be considered as illustrative and not restrictive, and the invention is not to be limited to the details given herein, but may be modified within the scope and equivalence of the appended claims.

What is claimed is:

1. A vehicle sun visor apparatus comprising:
    a light shield body for shielding incident light and capable of moving forward and rearward, the light shield body having a widthwise direction intersecting a movement direction of the light shield body and a thicknesswise direction perpendicular to the movement direction and the widthwise direction;
    a drive motor, fixed to a vehicle body, for moving the light shield body forward and rearward;
    at least one pair of slide guides arranged on the light shield body and extending in the movement direction of the light shield body, wherein one of the slide guides includes a meshing surface, a roll surface, and a side surface respectively extending in the movement direction, and the other one of the slide guides includes a side surface extending in the movement direction and one of a meshing surface and a roll surface extending in the movement direction, the side surfaces of the two slide guides being arranged to be separated from each other in the widthwise direction in a state facing each other or facing opposite directions; and
    a plurality of supports for holding the pair of slide guides in the thicknesswise direction, wherein the plurality of supports include a pair of first supports respectively corresponding to the pair of slide guides and a second support corresponding to at least one of the slide guides, either one of each of the first supports and the second support is a drive gear meshed with the meshing surface of the corresponding slide guide and rotated by the drive motor, the other one of each of the first supports and the second support is a rotation roller that is rollable on the roll surface, and the two first supports each have a contact portion that comes into contact with the corresponding side surface.

2. The apparatus according to claim 1, further comprising:
    a stopper arranged on at least one of two end portions of the roll surface in the movement direction, wherein the stopper comes into contact with the rotation roller before the drive gear reaches an end portion of the meshing surface in the movement direction.

3. The apparatus according to claim 1, further comprising:
    a bracket fixed to the vehicle body, wherein the bracket supports the drive gear and the rotation roller with a common shaft.

4. The apparatus according to claim 1, wherein the drive gear and the rotation roller are formed integrally from a resin material so that the drive gear and the rotation roller are arranged coaxially.

5. The apparatus according to claim 4, wherein an outer diameter of a circle along the distal ends of the teeth of the drive gear differs from an outer diameter of the rotation roller so that a step is formed between the meshing surface and the roll surface, the side surface being formed on the step.

6. The apparatus according to claim 5, wherein the outer diameter of a circle along the distal ends of the teeth of the drive gear is smaller than the outer diameter of the rotation roller.

7. The apparatus according to claim 2, wherein:
    the drive gear and the rotation roller are formed integrally from a resin material so that the drive gear and the rotation roller are arranged coaxially;
    the outer diameter of a circle along the distal ends of the teeth of the drive gear differs from an outer diameter of the rotation roller so that a step is formed between the meshing surface and the roll surface, the side surface being formed on the step; and
    the stopper is formed by an end surface of the slide guide so as to be connected to the side surface and intersect with the roll surface.

8. The apparatus according to claim 1, wherein the rotation roller has a circumferential surface that comes into contact with the roll surface, and the circular circumferential surface is formed from an elastic material.

9. The apparatus according to claim 1, wherein:
    the pair of slide guides are arranged respectively at two ends of the light shield body in the widthwise direction;
    the meshing surface is arranged on each of the pair of slide guides, and the drive gears are respectively meshed with the meshing surfaces; and
    the drive gears respectively corresponding to the slide guides are fixed to a single rotation shaft and rotated in synchronization by the drive motor.

10. The apparatus according to claim 1, wherein the drive motor and the light shield body are arranged in a roof portion of the vehicle, the apparatus further comprising:
    an operation switch and a light receiving sensor, the drive motor being driven based on a signal output from at least one of the operation switch and the light receiving sensor so that the light shield body moves out of the roof portion and covers at least part of a window glass.

11. The apparatus according to claim 1, further comprising:
    a rotational body connected to an output shaft of the drive motor so that rotation of the rotational body relative to the output shaft is restricted; and
    an engagement clutch for engaging the rotational body with the drive gear and integrally rotating the rotational body and the drive gear;
    wherein the engagement clutch cancels the engagement between the rotational body and the drive gear when external force of a predetermined value or greater is applied to the light shield body.

12. The apparatus according to claim 11, wherein the engagement clutch includes:
    a first engagement portion and a second engagement portion formed in the rotational body and the drive gear and being engageable through a concavo-convex relationship;

an urging portion for urging at least one of the rotational body and the drive gear in a direction for engaging the two engagement portions;

wherein at least one of the first engagement portion and the second engagement portion has an inclined surface inclined in a circumferential direction of the rotational body and the drive gear; and the urging portion permits at least one of the rotational body and the drive gear to move away from the other one of the rotational body and the drive gear when external force of the predetermined value or greater is applied to the light shield body.

13. The apparatus according to claim 12, wherein:

the predetermined value is set greater than the driving force applied by the drive motor to the light shield body; and an inclination angle of the inclined surface and an urging force of the urging portion are set to cancel the engagement between the rotational body and the drive gear when external force of the predetermined value or greater is applied to the light shield body.

14. The apparatus according to claim 12, wherein the rotational body functions as the rotation roller.

15. The apparatus according to claim 12, wherein:

the pair of slide guides are arranged at the two ends of the light shield body in the widthwise direction;

the meshing surface is arranged on each of the pair of slide guides, and the drive gears are respectively engaged with the meshing surfaces;

the drive gears respectively corresponding to the slide guides are fixed to a single rotation shaft and rotated in synchronization by the drive motor; and the engagement clutch is arranged between one of the two drive gears and the drive motor.

16. A vehicle sun visor apparatus comprising:

a light shield body for shielding incident light entering a passenger compartment and capable of moving forward and rearward, the light shield body having a widthwise direction intersecting the movement direction of the light shield body and a thicknesswise direction perpendicular to the movement direction and the widthwise direction;

at least three pairs of supports for supporting the light shield body, wherein the supports are arranged to permit the light shield body to move forward and rearward and restrict movement of the light shield body in the thicknesswise direction; and a drive motor for directly or indirectly rotating at least one of the supports for moving the light shield body forward and rearward;

wherein the light shield body has at least one pair of side surfaces extending in the movement direction, and the side surfaces are arranged to face each other or face opposite directions spaced from each other in the widthwise direction; and wherein at least two pairs of the supports include contact portions respectively coming into contact with the at least one pair of side surfaces.

17. The apparatus according to claim 16, wherein:

the supports that come into contact with the side surfaces each include a large-diameter portion and a small-diameter portion, formed coaxially with the large-diameter portion and having a smaller diameter than the large-diameter portion; and one of an end surface of the large-diameter portion facing toward the small-diameter portion and an end surface of the small-diameter portion opposite to the large-diameter portion forms the contact portion.

18. The apparatus according to claim 16, wherein the light shield body includes a pair of stepped portions extending in the movement direction and formed in a manner spaced from each other in the widthwise direction, and the side surfaces connect two surfaces of the stepped portions having a height difference in the thicknesswise direction.

19. The apparatus according to claim 18, wherein the light shield body includes a light shield plate for shielding the incident light and a frame member attached to a peripheral portion of the light shield plate, the stepped portions being formed on the frame member.

20. The apparatus according to claim 16, further comprising:

a plurality of gear teeth formed on an outer circumference of each of the supports, which are rotated directly or indirectly by the drive motor, and arranged in a circumferential direction of each holder; and a meshing portion, formed on the light shield body, for meshing with the gear teeth.

21. The apparatus according to claim 16, wherein at least one pair of the supports come into contact with a surface of the light shield body and functions as an auxiliary roller rotated as the light shield body moves forward and rearward.

* * * * *